United States Patent
Choi et al.

(10) Patent No.: US 12,074,330 B2
(45) Date of Patent: Aug. 27, 2024

(54) CONDUCTIVE ARRAY, COMPOSITE MEMBRANE INCLUDING THE CONDUCTIVE ARRAY, LITHIUM BATTERY INCLUDING THE COMPOSITE MEMBRANE, AND METHOD OF MANUFACTURING THE CONDUCTIVE ARRAY

(71) Applicant: SAMSUNG ELECTRONICS CO., LTD., Suwon-si (KR)

(72) Inventors: Wonsung Choi, Seoul (KR); Kyounghwan Choi, Suwon-si (KR); Youngeal Kim, Hwaseong-si (KR); Hyunjin Kim, Seoul (KR); Huisu Jeong, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 269 days.

(21) Appl. No.: 16/730,007

(22) Filed: Dec. 30, 2019

(65) Prior Publication Data

US 2020/0220179 A1    Jul. 9, 2020

(30) Foreign Application Priority Data

Jan. 3, 2019    (KR) .................. 10-2019-0000855

(51) Int. Cl.
*H01M 4/86* (2006.01)
*H01B 1/08* (2006.01)
(Continued)

(52) U.S. Cl.
CPC .......... *H01M 4/8626* (2013.01); *H01B 1/08* (2013.01); *H01B 5/16* (2013.01); *H01B 13/0016* (2013.01);
(Continued)

(58) Field of Classification Search
None
See application file for complete search history.

(56) References Cited

U.S. PATENT DOCUMENTS

| 4,828,945 A | 5/1989 | Nagata et al. |
| 7,282,295 B2 | 10/2007 | Visco et al. |

(Continued)

FOREIGN PATENT DOCUMENTS

| CN | 103515633 A | 1/2014 |
| CN | 104693105 A | 6/2015 |

(Continued)

OTHER PUBLICATIONS

Matthew R. Jones, Kyle D. Osberg, Robert J. Macfarlane, Mark R. Langille, and Chad A. Mirkin, Templated Techniques for the Synthesis and Assembly of Plasmonic Nanostructures, 2011, Chemical Reviews 2011 111 (6), 3736-3827 DOI: 10.1021/cr1004452 (Year: 2011).*

(Continued)

*Primary Examiner* — Ula C Ruddock
*Assistant Examiner* — Mary Grace Byram
(74) *Attorney, Agent, or Firm* — CANTOR COLBURN LLP

(57) ABSTRACT

A conductive array, a composite membrane including the conductive array, a lithium battery, and a method of manufacturing the conductive array. The conductive array includes a plurality of ion conductive inorganic particles spaced apart from each other, wherein the circumferences (x) and the width (y) of a top surface of an ion conductive inorganic particle of the plurality of ion conductive inorganic particles in plan view satisfy Inequality (1), $x \geq 3.2y$, and      Inequality (1)

a distance between a first ion conductive inorganic particle of the plurality of ion conductive inorganic particles and an (Continued)

adjacent second ion conductive inorganic particle in a plan view is 0% to about 20% of the width of the surface of the ion conductive inorganic particle.

19 Claims, 18 Drawing Sheets

(51) Int. Cl.
    H01B 5/16        (2006.01)
    H01B 13/00       (2006.01)
    H01M 10/052      (2010.01)
    H01M 10/0562     (2010.01)
    H01M 12/08       (2006.01)

(52) U.S. Cl.
    CPC ..... *H01M 10/052* (2013.01); *H01M 10/0562* (2013.01); *H01M 12/08* (2013.01); *H01M 2004/8689* (2013.01); *H01M 2300/0068* (2013.01)

(56) References Cited

U.S. PATENT DOCUMENTS

| | | | |
|---|---|---|---|
| 7,691,536 B2 | 4/2010 | Johnson | |
| 7,767,345 B2 | 8/2010 | Imagawa et al. | |
| 9,166,263 B2 | 10/2015 | Ma et al. | |
| 9,178,254 B2 | 11/2015 | Lee et al. | |
| 9,263,779 B2 | 2/2016 | Lee et al. | |
| 9,281,482 B2 | 3/2016 | Song et al. | |
| 9,520,627 B2 | 12/2016 | Aetukuri et al. | |
| 9,590,191 B2 | 3/2017 | Song et al. | |
| 9,608,210 B2 | 3/2017 | Song et al. | |
| 9,680,191 B2 | 6/2017 | Lee et al. | |
| 9,780,386 B2 | 10/2017 | Kwon et al. | |
| 9,911,957 B2 | 3/2018 | Choi et al. | |
| 9,947,933 B2 | 4/2018 | Roev et al. | |
| 10,008,753 B2 | 6/2018 | Kwon et al. | |
| 10,020,482 B2 | 7/2018 | Christensen et al. | |
| 2007/0231704 A1 | 10/2007 | Inda | |
| 2008/0070087 A1 | 3/2008 | Johnson | |
| 2009/0212267 A1* | 8/2009 | Dobbs | H01M 4/136 252/521.2 |
| 2011/0059355 A1 | 3/2011 | Zhang et al. | |
| 2011/0129739 A1 | 6/2011 | Nakanishi | |
| 2011/0223494 A1 | 9/2011 | Feaver et al. | |
| 2012/0077084 A1 | 3/2012 | Christensen et al. | |
| 2012/0077095 A1 | 3/2012 | Roumi et al. | |
| 2012/0115048 A1 | 5/2012 | Roev et al. | |
| 2012/0276459 A1 | 11/2012 | Im et al. | |
| 2013/0224609 A1 | 8/2013 | Lee et al. | |
| 2015/0079485 A1 | 3/2015 | Choi et al. | |
| 2015/0255767 A1 | 9/2015 | Aetukuri et al. | |
| 2016/0181585 A1* | 6/2016 | Choi | H01M 50/403 429/246 |
| 2016/0322685 A1 | 11/2016 | Choi | |
| 2017/0093002 A1* | 3/2017 | Choi | H01M 12/08 |
| 2018/0040898 A1 | 2/2018 | Lee et al. | |
| 2018/0182969 A1 | 6/2018 | Fujiyama et al. | |

FOREIGN PATENT DOCUMENTS

| | | |
|---|---|---|
| CN | 107591567 A | 1/2018 |
| CN | 107978789 A | 5/2018 |
| JP | 4269917 B2 | 5/2009 |
| JP | 2012089420 A | 5/2012 |
| KR | 1019970004136 B1 | 3/1997 |
| KR | 101127693 B1 | 3/2012 |
| KR | 1020170037495 A | 4/2017 |
| KR | 1020180079627 A | 7/2018 |

OTHER PUBLICATIONS

Rongfang Zhao, Xiao Shen, Qianhui Wu, Xiue Zhang, Wenlong Li, Ge Gao, Lingyun Zhu, Lubin Ni, Guowang Diao, and Ming Chen ACS Applied Materials & Interfaces 2017 9 (29), 24662-24670 DOI: 10.1021/acsami.7b07443 (Year: 2017).*
Office Action dated Feb. 19, 2024, of the corresponding Chinese Patent Application No. 201910842105.4.

\* cited by examiner

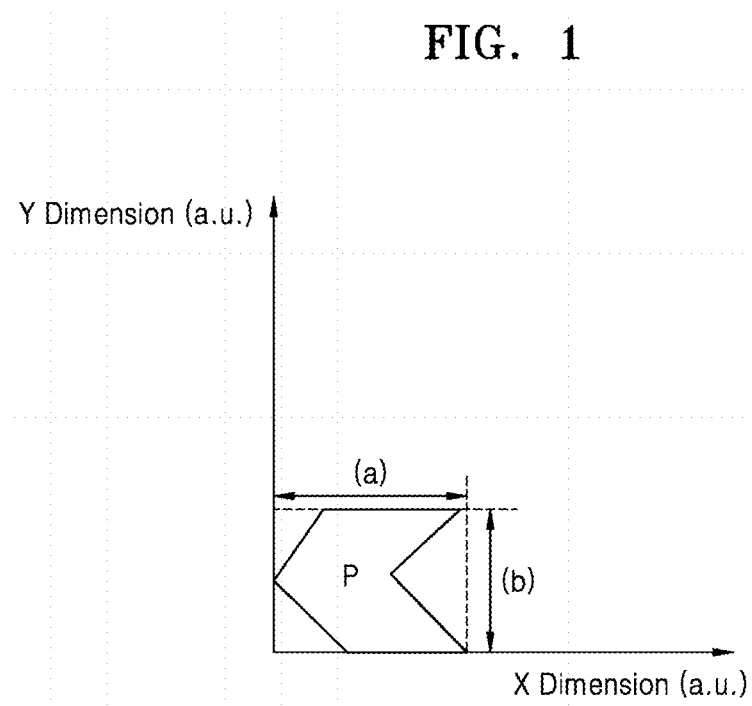

CONDUCTIVE ARRAY, COMPOSITE MEMBRANE INCLUDING THE CONDUCTIVE ARRAY, LITHIUM BATTERY INCLUDING THE COMPOSITE MEMBRANE, AND METHOD OF MANUFACTURING THE CONDUCTIVE ARRAY

CROSS-REFERENCE TO RELATED APPLICATION

This application claims priority to and the benefit of Korean Patent Application No. 10-2019-0000855, filed on Jan. 3, 2019, in the Korean Intellectual Property Office, and all the benefits accruing therefrom under 35 U.S.C. § 119, the content of which is incorporated herein in its entirety by reference.

BACKGROUND

1. Field

The present disclosure relates to a conductive array, a composite membrane including the conductive array, a lithium battery each including the conductive array, and a method of preparing the conductive array.

2. Description of the Related Art

Lithium air batteries include an anode that enables intercalation/deintercalation of lithium ions, a cathode that catalyzes oxidation and reduction of oxygen while using oxygen in the air as a cathode active material, and a lithium-ion-conductive medium between the cathode and the anode.

Lithium air batteries have a theoretical specific energy of 3,000 watt-hours per kilogram (Wh/kg) or greater, which is much higher than that of lithium ion batteries. In addition, lithium air batteries are environmentally friendly and are more stable than lithium ion batteries.

Unlike lithium ion batteries, in lithium air batteries, the cathode has an open structure in which oxygen reacts, and lithium reacts at the cathode. Accordingly, there is a need to provide an oxygen blocking film that prevents side reactions caused by oxygen and has excellent ion conductivity.

Accordingly, there is a need to produce an oxygen blocking film having excellent, uniform ion conductivity, and excellent mechanical strength.

SUMMARY

Provided is a conductive array.

Provided is a composite membrane employing the conductive array.

Provided is a lithium battery including the composite membrane.

Provided is a method of producing the conductive array.

Additional aspects will be set forth in part in the description which follows and, in part, will be apparent from the description, or may be learned by practice of the presented embodiments.

According to an aspect of an embodiment, a conductive array includes a plurality of ion conductive inorganic particles spaced apart from each other, wherein a circumference (x) and a width (y) of a surface of an ion conductive inorganic particle of the plurality of conductive inorganic particles in a plan view satisfy the following Inequality (1), $x \geq 3.2y$, and  Inequality (1)

a distance between a first ion conductive inorganic particle of the plurality of inorganic particles and an adjacent second ion conductive inorganic particle in a plan view is 0% to about 20% of the width of the surface of the ion conductive inorganic particle.

According to an aspect of an embodiment, a composite membrane includes: the conductive array; and an organic material filled between the ion conductive inorganic particles included in the conductive array.

According to an aspect of an embodiment, a lithium battery includes the composite membrane.

According to an aspect of an embodiment, a method of producing the conductive array includes:
  forming a plurality of openings in a substrate;
  filling the openings with precursors of the plurality of ion conductive inorganic particles; heat-treating the substrate filled with the plurality of ion conductive inorganic particles; and
  transferring the ion conductive inorganic particles to form a conductive array.

BRIEF DESCRIPTION OF THE DRAWINGS

These and/or other aspects will become apparent and more readily appreciated from the following description of the embodiments, taken in conjunction with the accompanying drawings in which:

FIG. 1 is a graph of X dimension (arbitrary units, a.u.) versus Y dimension (a.u.) and shows a schematic diagram of an embodiment of an ion conductive inorganic particle, and illustrating that the width of the ion conductive inorganic particle is defined as the greater dimension, e.g., the greater of (a) and (b);

DETAILED DESCRIPTION

Figure 2A:
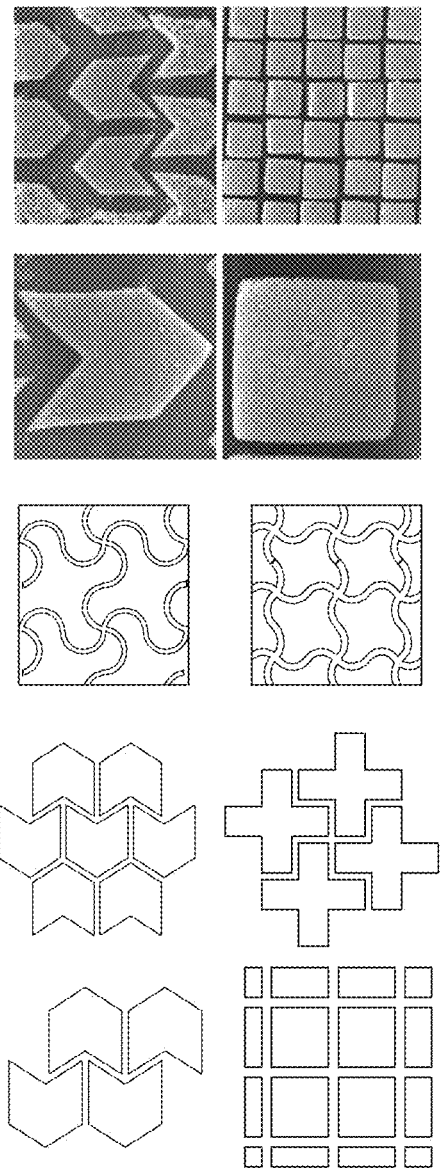
FIG. 2A shows a schematic plan view of an embodiment of a conductive array.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The present inventive concept described below may be transformed in various manners. Accordingly, particular embodiments are illustrated in the drawings and described in detail in the description. However, this is not intended to limit the inventive concept to particular modes of practice, and it is to be appreciated that all changes, equivalents, and substitutes that do not depart from the spirit and technical scope are encompassed in the inventive concept.

It is to be understood that the terms used herein is for the purpose of describing particular examples only and is not intended to limit the scope of the disclosure. An expression used in the singular encompasses the expression of the plural, unless it has a clearly different meaning in the context. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or."

In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. The expression "I" used below may be interpreted as "and" or "or".

In the drawings, to clearly illustrate elements, layers and regions, diameters, lengths, and thicknesses are enlarged or shrunk in size. Like components are designated with like reference numerals throughout the specification. It will be understood that when a component, such as a layer, a film, a region, or a plate, is referred to as being "on" another component, the component may be directly on the other component or intervening components may be present thereon. While such terms as "first," "second," etc., may be used to describe various components, such components must not be limited to the above terms. The above terms are used only to distinguish one component from another. In the drawings, some components may be omitted. However, the omission is to help understanding of the disclosure and is not intended to exclude the omitted components.

Furthermore, relative terms, such as "bottom" and "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "bottom" side of other elements would then be oriented on "top" sides of the other elements. The exemplary term "bottom," can therefore, encompasses both an orientation of "bottom" and "top," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Oxide-based solid electrolytes may be used as materials for forming an oxygen blocking films that may help prevent side reactions caused by oxygen and may have excellent ion conductivity in a lithium air battery. However, with use of oxide-based solid electrolytes process costs may be expensive, production of large-area films may be difficult, the shape of oxygen blocking films may be limited, the materials may be fragile due to low mechanical strength, and reductions in weight or thickness may be limited.

Hereinafter, a conductive array according to an embodiment, a composite membrane including the same, and a method for manufacturing a lithium battery and a conductive array will be described in detail.

According to an aspect, a conductive array according to an embodiment includes a plurality of ion conductive inorganic particles spaced apart from each other, wherein a circumference (x) and a width (y) of a top surface of an ion conductive inorganic particle of the plurality of ion conductive inorganic particles satisfies Inequality (1), $$x \geq 3.2y, \text{ and} \qquad \text{Inequality (1)}$$

a distance between a first ion conductive inorganic particle of the plurality of ion conductive inorganic particles and an adjacent second ion conductive inorganic particle is 0% to about 20% of the width of the surface of the ion conductive inorganic particle. The circumference and width of the top surface of an ion conductive inorganic particle can be determined in a plan view of the conductive array.

In an aspect, the conductive array may include a plurality of ion conductive inorganic particles spaced apart from each other, wherein a circumference (x) and a width (y) of a top surface of an ion conductive inorganic particle of the plurality of ion conductive inorganic particles in a plan view satisfy Inequality (1)

$$x \geq 3.2y, \text{ and} \qquad \text{Inequality (1)}$$

a distance between a first ion conductive inorganic particle of the plurality of ion conductive inorganic particles and an adjacent second ion conductive inorganic particle in the plan view is 0% to about 20% of the width of the surface of the ion conductive inorganic particle. In an embodiment, about 50% to about 100%, about 60% to about 99%, about 70% to about 95%, or about 80% to about 90% of the plurality of ion conductive inorganic particles satisfy Inequality (1).

Regarding the "top surface" and the "bottom surface" of the ion conductive inorganic particle, the top surface of the ion conductive inorganic particle is a surface thereof that contacts a conductive array, and the bottom surface of the ion conductive inorganic particle is a surface that is opposite the top surface.

The expression "surface" used herein is an element that is defined in two dimensions, and as viewed in a plan view of the conductive array.

Here, the "circumference" of the top surface or the bottom surface refers to the sum of the lengths of peripheral lines forming a circumference of the top surface or the bottom surface.

The "width" of the top surface and the bottom surface will be described in connection with FIG. 1. When a top surface or a bottom surface (P) is placed, e.g., plotted, in a graph having an x axis and a y axis, from among the length (a) of the top or bottom surface in the x axis and the length (b) of the top or bottom surface in the y axis, the greater length is defined as the "width." For example, when the top or bottom surface is circular, the diameter corresponds to the width, and when the top or bottom surface is polygonal, from among the horizontal length and the perpendicular length, the greater length corresponds to the width.

The expression "interval" of adjacent particles refers to the shortest distance between the particles.

The conductive array according to an embodiment includes a plurality of inorganic particles, each having a circumference which is 3.2 times or greater than the width thereof. Since the ratio of the circumference to the width is equal to or greater than the Pi ($\pi$), the top or bottom surface may have a greater cross-section area than a circle having the same width.

Since the intervals of adjacent ion conductive inorganic particles from among the ion conductive inorganic particles are as described above, in consideration of the width of inorganic particles, the inorganic particles may be arranged as densely as possible in an array.

Accordingly, when the inorganic particles are arranged to provide an array having a selected area, they are densely arranged and the space between adjacent inorganic particles is minimized. As such, a conductive array having improved packing density may be provided.

While not wanting to be bound by theory, it is understood that the ion current density of a conductive array is proportional to the occupancy of conductive inorganic particles, when the occupancy of the conductive array is determined in a plan view, e.g., as viewed from above. Accordingly, due to the inclusion of such a top surface and/or a bottom surface, when top or bottom surfaces of a plurality of inorganic particles are arranged as densely as possible, excellent ion current density may be obtained.

In an embodiment, from among the ion conductive inorganic particles, the interval between a selected inorganic particle and an inorganic particle adjacent thereto may be about 5% to about 20% of the width of the certain inorganic particle. In an embodiment, the interval between a certain inorganic particle and an inorganic particle adjacent thereto may be about 5% to about 10% of the width of the certain inorganic particle, or about 7% to about 15%, or about 9% to about 12%.

In an embodiment, the ion conductive inorganic particles may comprise three-dimensional particles having a perpendicular length, in a direction corresponding to a bottom surface of the conductive array of greater than 0 to about 1 micrometer (μm), e.g., 0.010 μm to about 0.5 μm.

The ion conductive inorganic particles may have, for example, a vertical and horizontal cross-sectional shape, such as a triangular shape, a quasi-triangular shape, a triangular shape with semi-circles, a triangular shape with a rounded corner, a square shape, a rectangular shape, a rectangular shape with semi-circles, and a polygonal shape. The ion conductive inorganic particles may have various shapes, for example, a cube shape, a rod shape, a stick shape, a tetrahedral shape, a pyramid shape, an octahedral shape, a cylinder shape, a polygonal pillar shape, a polygonal pillar-like shape, a dendritic shape, or a bar shape.

The height of the ion conductive inorganic particles may be 1 millimeter (mm) or less, but is not limited thereto. In an embodiment, the height of the ion conductive inorganic particles may be 500 micrometers (μm) or less. In an embodiment, the height of the ion conductive inorganic particles may be 300 μm or less. In an embodiment, the height of the ion conductive inorganic particles may be 200 μm or less. In an embodiment, the height of the ion conductive inorganic particles may be 100 μm or less. In an embodiment, the height of the ion conductive inorganic particles may be 50 μm or less, e.g., about 0.01 μm to about 500 μm, or about 0.1 μm to 100 μm. In an embodiment, at least two ion conductive inorganic particles of the plurality of ion conductive inorganic particles have a same height. For example, the ion conductive inorganic particles may have an identical height.

FIG. 2A shows a schematic plan view of a conductive array according to an embodiment.

Referring to FIG. 2A, configurations and arrangements of the inorganic particles and the top or bottom surfaces thereof are shown.

The shapes of the top surface, bottom surfaces of the ion conductive inorganic particles are not limited to those shown in FIG. 2A.

The top surface and/or the bottom surfaces of the ion conductive inorganic particles may have a square shape, a polygonal shape, or a non-circular closed curve shape.

As shown in FIG. 2A, the inorganic particles may be arranged as densely as possible according to the shape of the top surface or the bottom surface, thereby realizing, e.g., providing, a high-density packed conductive array as described above.

Figure 2B:
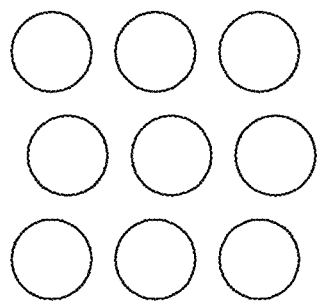
FIG. 2B shows a schematic plan view of a conductive array in which inorganic particles having top or bottom circular surfaces are arranged.

FIG. 2B is a plan view schematically showing a conductive array in which top or bottom surfaces of the inorganic particles are circular, unlike as shown in FIG. 2A.

Referring to FIG. 2B, compared to those shown in FIG. 2A, the intervals between the inorganic particles is greater, and the proportion of the area occupied by the inorganic particles, based on the area of conductive array, is remarkably low.

Each ion conductive inorganic particle may each have a top surface and a bottom surface.

The top surface and the bottom surface of each of a first ion conductive inorganic particle and a second ion conductive inorganic particle of the plurality of ion conductive inorganic particles may have a same shape and independently a same surface area. For example, the top surface and the bottom surface may have an identical shape and a same surface area, but embodiments thereof are not limited thereto.

A surface area of a top surface and a bottom surface of a first ion conductive inorganic particle and a surface area of a top surface and a bottom surface of a second ion conductive inorganic particle of the plurality of ion conductive inorganic particles may be the same or different. For example, a surface area of the top surface and the bottom surface may be different, but embodiments thereof are not limited thereto.

In an embodiment, the ion conductive inorganic particles may all have an identical top surface and/or an identical bottom surface.

In an aspect, the plurality of inorganic particles may be more efficiently packed at a high density, and the process of forming openings in a substrate may be simplified in the method of manufacturing a conductive array will be further described later.

According to an embodiment, the width may be a maximum width of the ion conductive inorganic particle of the plurality of ion conductive inorganic particles in the plan view. For example, the width of at least one of the top surface and/or the bottom surface of each of the ion conductive inorganic particles may be the maximum width of the ion conductive inorganic particle. In this case, more efficient packing of inorganic particles may be achieved.

An embodiment will be described in more detail with reference to FIGS. 3A and 3B.

Figure 3A:
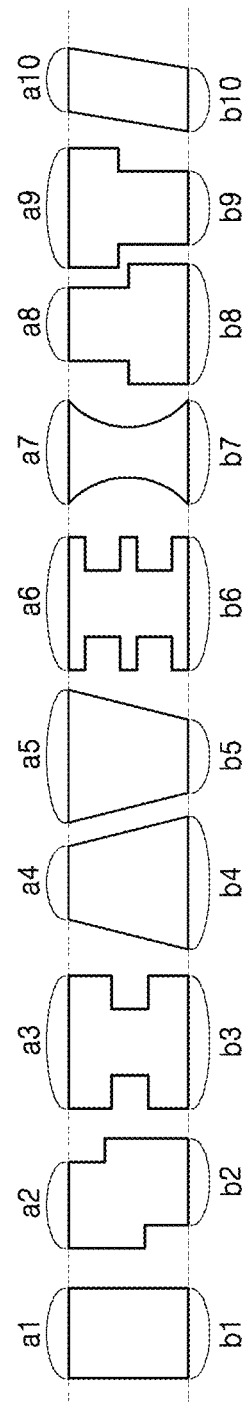
FIG. 3A shows a schematic side view of an ion conductive inorganic particle according to an embodiment.
Figure 3B:
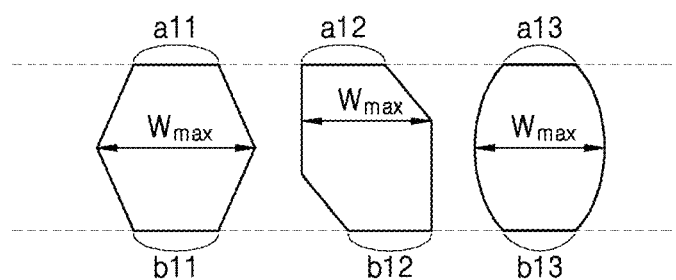
FIG. 3B shows a schematic side view illustrating inorganic particles of which widths of top or bottom surfaces are not a maximum width of the particles.

FIG. 3A shows a schematic side view of an ion conductive inorganic particle according to an embodiment, and FIG. 3B shows a schematic side view illustrating an inorganic particle of which a width of a top surface and a width of a bottom surface are not a maximum width.

Referring to FIG. 3A, when the widths (e.g., dimensions b1, b2, a3, a4, a5, a6, a7, a8, and a9) of the top surfaces or the widths (e.g., dimensions b3, b4, b5, b6, b7, b8, and b9) of the bottom surfaces of the particles are a maximum width thereof, independently from the shapes of side surfaces thereof, adjacent particles may be packed as densely as possible to each other.

Also, referring to the shapes shown in FIG. 3A, the particles may have a rectangular side surface or a shape having an indentation between the top surface and the bottom surface thereof. While not wanting to be bound by theory, it is understood that the indentation allows for a more rigid packing between neighboring particles, thereby enhancing a mechanical strength, e.g., a mechanical strength in a horizontal direction, of the conductive array and the composite membrane including the conductive array.

However, when the width of a surface other than the top surfaces (a11, a12, a13) or the bottom surfaces (b11, b12, b13) is the maximum width ($W_{max}$) of the inorganic particle, when viewed from the top and/or bottom surfaces, the widths between adjacent inorganic particles are increased, so that it is difficult to efficiently pack the inorganic particles.

In an embodiment, a total top surface area of the plurality of ion conductive inorganic particles in the plan view may be equal to greater than about 80% to about 99.9% of a total bottom surface area of the conductive array, the plurality of ion conductive inorganic particles may each have a bottom surface which is opposite the top surface of each ion conductive inorganic particle of the plurality of ion conductive inorganic particles in the plan view, and a total bottom surface area of the plurality of ion conductive inorganic particles may be equal to or greater than about 80% to about 99% of a total bottom surface area of the conductive array in the plan view. For example, the sum of the area of the top surfaces of the ion conductive inorganic particles and the sum of the area of the bottom surfaces thereof may each be 80% or greater than the total area of the bottom surface of the conductive array.

In an embodiment, the sum of the area of the top surfaces of the ion conductive inorganic particles and the sum of the area of the bottom surfaces may each be about 80% to about 90% of the total area of the bottom surface of the conductive array, e.g., the total bottom surface area. In an embodiment, the sum of the area of the top surfaces of the ion conductive inorganic particles and the sum of the area of the bottom surfaces may each be about 80% to about 95% of the total area of the bottom surface of the conductive array, e.g., the total bottom surface area. In an embodiment, the sum of the area of the top surfaces of the ion conductive inorganic particles and the sum of the area of the bottom surfaces may each be about 80% to about 85% of the total area of the bottom surface of the conductive array, e.g., the total bottom surface area. The sum of the area of the top or bottom surfaces of the ion conductive inorganic particles divided by the total area of the bottom surface of the conductive array, e.g., the total bottom surface area, is also referred to herein as the occupancy percent.

In an embodiment, the width of each of the plurality of ion conductive inorganic particles is about 98% to about 102% of an average width of the ion conductive inorganic particles of the plurality of ion conductive inorganic particles. For example, the width of each of the ion conductive inorganic particles may be about 98% to about 102%, based on an average width of the ion conductive inorganic particles. That is, the widths of the inorganic particles may be distributed within the range of the average width of the ion conductive inorganic particles plus or minus 2%.

For example, the width of the ion conductive inorganic particles may be less than 1 mm or less, but is not limited thereto.

For example, the area of the top surface or bottom surface of the ion conductive inorganic particles may be 0.25 square millimeters ($mm^2$) or less, but is not limited thereto.

The ion conductive inorganic particles may be, for example, lithium ion conductive inorganic particles.

In an embodiment, the ion conductive inorganic particles may include at least one of a glass, e.g., glassy active metal ion conductor, an amorphous active metal ion conductor, a ceramic active metal ion conductor, or a glass-ceramic active metal ion conductor.

In an embodiment, the ion conductive inorganic particles may be at least one of $Na_{1+x}Zr_2Si_xP_{3-x}O_{12}$, wherein $0<x<3$ ("NASICON"), $Li_{1+x+y}Al_xTi_{2-x}Si_yP_{3-y}O_{12}$, wherein $0<x<2$ and $0 \leq y<3$, $BaTiO_3$, $Pb(Zr_aTi_{1-a})O_3$, wherein $0 \leq a \leq 1$ ("PZT"), $Pb_{1-x}La_xZr_{1-y}Ti_yO_3$, wherein $0 \leq x<1$, $0 \leq y<1$, and $0 \leq a \leq 1$ ("PLZT"), $Pb(Mg_3Nb_{2/3})O_3$—$PbTiO_3$ ("PMN-PT"), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$, wherein $0<x<2$, $0<y<1$, and $0<z<3$), $Li_{1+x+y}(Al_aGa_{1-a})_x(Ti_bGe_{1-b})_{2-x}Si_yP_{3-y}O_{12}$, wherein $0 \leq x \leq 1$, $0 \leq y \leq 1$, $0 \leq a \leq 1$, and $0 \leq b \leq 1$, lithium lanthanum titanate ($Li_xLa_yTiO_3$, wherein $0<x<2$ and $0<y<3$), lithium germanium thiophosphate ($Li_xGe_yP_zS_w$, wherein $0<x<4$, $0<y<1$, $0<z<1$, and $0<w<5$), lithium nitride based glass ($Li_xN_y$, wherein $0<x<4$ and $0<y<2$), $SiS_2$, $Li_xSi_yS_z$, wherein $0<x<3$, $0<y<2$, and $0<z<4$, $P_2S_5$-based glass ($Li_xP_yS_z$, wherein $0<x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, or a Garnet-based ceramic of the formula $Li_{3+x}La_3M_2O_{12}$, wherein M is Te, Nb, or Zr and x is an integer of 1 to 10. The Garnet-based ceramics may be, for example, $Li_7La_3Zr_2O_{12}$.

According to an aspect, the composite membrane according to an embodiment includes the conductive array described above, and an organic material filled between a plurality of ion conductive inorganic particles included in the conductive array.

The composite membrane functions as an oxygen barrier membrane, a moisture blocking membrane, or a carbon dioxide barrier membrane.

In an embodiment, the composite membrane may be a foldable, flexible membrane. Due to the flexibility, the composite membrane may be applied to, e.g., used in, a foldable cell.

In an embodiment, the tensile strength of the composite membrane may be 1 megaPascal (MPa) or greater, 10 MPa or greater, 15 MPa or greater, 20 MPa or greater, 25 MPa or greater, 30 MPa or greater, 35 MPa or greater, 40 MPa or greater, or 45 MPa or greater, and, for example, 100 MPa or less, e.g., 1 MPa to 100 MPa, or 10 MPa to 80 MPa. Since the composite membrane has an increased tensile strength, the composite membrane may provide excellent mechanical properties. The yield strain of the composite membrane may be 1% or greater, 1.5% or greater, 2% or greater, or 2.5% or greater, and, for example, about 99% or less, e.g., 1% to 99%, or 2% to 90%. Since the composite membrane has an increased yield strain, the composite membrane has flexibility and is bendable or foldable. Accordingly, the composite membrane may be applicable for various purposes.

In an embodiment, the organic material may be present in the form of an organic film in the composite membrane. The organic material is not particularly limited. For example, the organic material may be a polymer compound. For example, the polymer compound may be a fluorine-containing polymer, such as polyolefin, polyimide, and polytetrafluoroethylene ("PTFE"), or a cross-linked polymer.

In an embodiment, the composite membrane has a plurality of through holes, and a plurality of ion conductive inorganic particles are placed in the through holes.

Figure 4A:
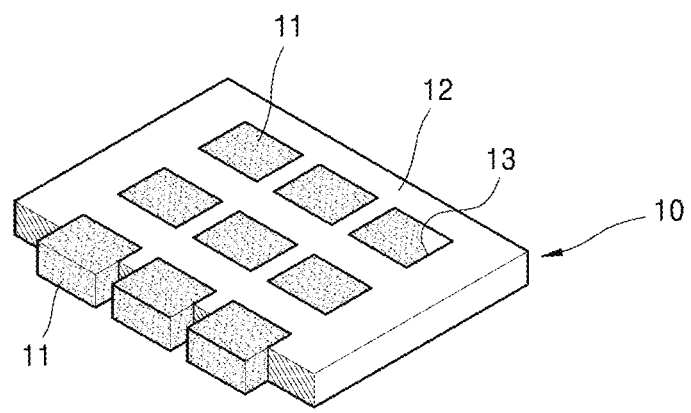
FIGS. 4A and 4B each show a schematic view of an embodiment of a composite membrane.
Figure 4B:
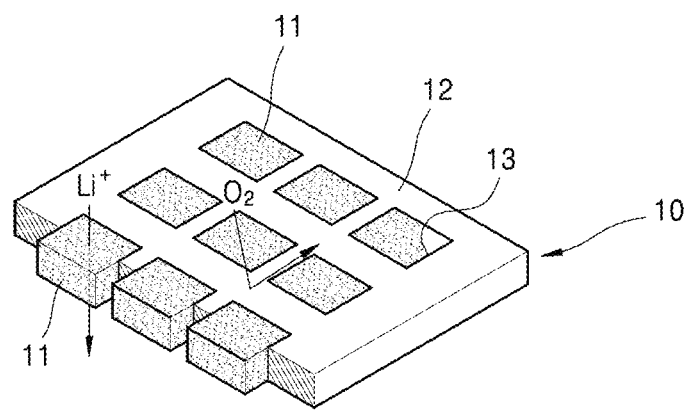

Referring to FIGS. 4A and 4B, a composite membrane 10 includes an organic film 12 having a plurality of through holes 13 and a plurality of ion conductive inorganic particles 11 placed in the through holes 13. The ion conductive inorganic particles 11 pass through the organic film 12, and are exposed to opposite sides of the composite membrane 10. The organic film 12 blocks oxygen or moisture. The ion conductive inorganic particles 11 exposed to opposite sides of the composite membrane 10 enable transferring of ions, for example, lithium ions. That is, since the organic film 12 blocks oxygen and/or moisture and the ion conductive inorganic particles 11 enables the transfer of ions, the composite membrane 10 is an optional permeable membrane. The ion conductive inorganic particles 11 are exposed to the surface of the composite membrane 10. The exposure areas of the ion conductive inorganic particles 11 may be 80% or greater of the total area of the composite membrane 10, e.g., the total composite membrane 10 surface area.

As is further described above, since the circumference of the top surface or bottom surface of ion conductive inorganic particles 11 is 3.2 times or greater than the width thereof, the ion conductive inorganic particles 11 may have a desirable exposure area ratio, and when the ion conductive inorganic particles 11 has a desirable exposure area, the ion conductivity of composite membrane 10 may be further improved. In an example of the composite membrane 10, the thickness of each of the ion conductive inorganic particles 11 refers to a difference in height between the top and bottom surfaces of each of the ion conductive inorganic particles, independently of the shape of each of the ion conductive inorganic particles, and the thicknesses of the ion conductive inorganic particles 11 are identical to that of the organic film 12. As such, when the thicknesses of the ion conductive inorganic particles 11 are identical to the thickness of the organic film 12, the composite membrane 10 may be easily bonded to other components with stronger binding force. In an embodiment, the thicknesses of the ion conductive inorganic particles 11 may be different from the thickness of the organic film 12. In an embodiment, the thickness of the organic film 12 may be about 90 mm, and the thickness of ion conductive inorganic particles 11 may be about 95 mm.

Referring to FIGS. 4A and 4B, the surface of the composite membrane 10 may have, for example, a sea-island structure: ion conductive inorganic particles 11 are discontinuously arranged in the organic film 12, wherein the organic film 12 is continuous. The cross section of the composite membrane 10 may have, for example, an alternately aligned structure: an organic film 12 and an ion conductive inorganic particle 11 are alternately aligned, wherein each of the organic film 12 and the ion conductive inorganic particle 11 is continuous, for example, in a single direction, across the composite membrane 10.

Referring to FIGS. 4A and 4B, in an example of the composite membrane 10, the ion conductive inorganic particles 11 embedded in the organic film 12 may be a monolayer. Since the ion conductive inorganic particles 11 are arranged as the monolayer, the thickness of the organic film 12 may be decreased.

Referring to FIGS. 4A and 4B, the organic film 12 is a dense film having non-porosity characteristics. In an example of the composite membrane 10, the organic film 12 may further include at least one of a crosslinked copolymer, a homopolymer, a block copolymer, or a random copolymer.

Referring to FIGS. 4A and 4B, the ion conductive inorganic particles 11 may form an ion conductive region and the organic film 12 may form a non-ion conductive region. The ion conductive region and the non-ion conductive region are arranged in such a way that the ion conductive region contacts the non-ion conductive region in a film thickness direction (Y-axis direction), thereby providing a bicontinuous structure. The term "bicontinuous structure" used herein refers to a structure in which one or more ion conductive inorganic particles, which form the ion conductive region, contact one or more organic films (a polymer film), which form a non-ion conductive region, and thus, the ion conductive inorganic particles are interconnected with the organic films.

In an embodiment, a hydrophobic coating film (not shown) may be formed on at least a portion of the surfaces of the ion conductive inorganic particles 11. That is, the ion conductive inorganic particles 11 may be hydrophobized particles. A hydrophobic coating film may be a continuous coating film or a discontinuous coating film, such as an island. Since the hydrophobic coating film is introduced to at least a portion of the surfaces of the ion conductive inorganic particles, the buoyancy of the ion conductive inorganic particles in water may be controllable.

An example of the composite membrane may be used as a gas-permeation blocking film or a separator for a lithium air battery, and an anode protective film for a lithium battery.

The ion conductive inorganic particles 11 pass through from a top surface to a bottom surface of each of the organic films 12. Accordingly, the ion conductive inorganic particles are exposed to opposite surfaces of the composite membranes 10. As described above, due to the exposed surfaces, the flow path of lithium ions is provided, leading to an improvement in conductivity of a composite membrane. In the case of a lithium air battery, a ceramic film may be used to obtain an ion conducting function and an oxygen blocking function. A ceramic film may be heavy and may not be suitable for the manufacture of a large-size ceramic film. In addition, the shape of a ceramic film may be limited. Also, a ceramic film may crack when an external force is applied thereto. That is, a ceramic film may have a small mechanical strength. The composite membrane described above may be a thin film, leading to a decrease in resistance. Also, the composite membrane is may be formed as a large-size film. In addition, since the composite membrane has flexibility, the composite membrane may be processed into various shapes. Accordingly, the degree of freedom for cell design is high. Also, the composite membrane has high mechanical strength.

The composite membrane has an ion conductive region and a non-ion conductive region, the ion conductive region and the non-ion conductive region are arranged to be in contact with each other in a film thickness direction (the y-axis direction) to form a bicontinuous structure, and the ion conductive region includes ion conductive inorganic particles. Ion conductive inorganic particles are exposed to the surface of the composite membrane. Accordingly, while retaining ion conductivity, the composite membrane has high flexibility and excellent mechanical strength and thus, may be processed into various shapes.

An amount of ion conductive inorganic particles may be, for example, based on the total weight of 100 parts by weight of the composite membrane, in the range of about 10 parts by weight to about 90 parts by weight or about 20 parts by weight to about 80 parts by weight. When the amount of the ion conductive inorganic particles is within these ranges, the composite membrane may have excellent ion conductivity and excellent mechanical strength.

In addition, compared to a film formed of inorganic particles alone, the composite membrane may have high flexibility and high mechanical strength.

An example of the composite membrane may also be used as an anode protective film for a lithium secondary battery, such as a lithium sulfur secondary battery or an aqueous lithium ion secondary battery. Besides, the composite membrane may make a cathode, an anode and an electrolyte to be spaced apart from each other to increase performance of a lithium ion battery and probability of use of a novel material. When the composite membrane is used as a protective film for a lithium sulfur secondary battery or an aqueous lithium ion secondary battery, an organic film forms the non-ion conductive region, and the ion conductive inorganic particles form the ion conductive region.

In an embodiment, the weight of the composite membrane may be in the range of about 5 milligrams per square centimeter ($mg/cm^2$) to about 20 $mg/cm^2$, or about 8 $mg/cm^2$ to about 16 $mg/cm^2$. By using the composite membrane having these ranges of weight, a thin and light-weight battery may be manufactured.

In an embodiment, the thickness of the composite membrane may be in the range of about 10 μm to about 200 μm, or about 30 μm to about 100 μm. When the composite membrane has these ranges of thicknesses, the obtained composite membrane may have excellent characteristics in terms of ion conductivity and moisture and gas blocking characteristics.

An example of the composite membrane may further include a porous substrate.

The porous substrate may be any suitable substrate that has excellent mechanical characteristics and high heat resistance and has pores therein. The porous substrate may be, for example, an olefin-based polymer having high chemical resistance and hydrophobic properties; or a sheet or nonwoven fabric formed of glass fiber or polyethylene. The olefin-based polymer may be, for example, at least one of polyethylene, or polypropylene, and the porous substrate may be a mixed multiple-film, for example, a two-layer separator having the structure of polyethylene/polypropylene, a three-layer separator having the structure of polyethylene/polypropylene/polyethylene, and a three-layer separator having the structure of polypropylene/polyethylene/polypropylene. The porous substrate may be, for example, at least one of a polyethylene film, or a polypropylene film. The pore diameter of the porous substrate may be, for example, in the range of about 0.01 μm to about 10 μm, and the thickness thereof, may be, for example, in the range of about 5 μm to about 35 μm. The porous substrate may include an electrolytic solution including, for example, a lithium salt and an organic solvent. The amount of the lithium salt may be, for example, in the range of about 0.01 molar (M) to about 5 M, or about 0.2 M to about 2 M. Due the inclusion of these ranges of the lithium salt, the obtained composite membrane may have excellent conductivity. The lithium salt may be dissolved in a solvent to function as, for example, a supplier of lithium ions in a battery. The lithium salt may include, for example, at least one of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are each a natural number), LiF, LiBr, LiCl, LiOH, LiI, or $LiB(C_2O_4)_2$ (lithium bis (oxalato) borate; "LiBOB"). The composite membrane may further include, in addition to the lithium salt, other metal salts such as $AlCl_3$, $MgCl_2$, NaCl, KCl, NaBr, KBr, or $CaCl_2$.

An aspect of the disclosure provides a lithium battery including the composite membrane according to an embodiment.

An example of the lithium battery is a lithium air battery. The lithium air battery includes an anode, a composite membrane, and a cathode using oxygen as a cathode active material.

The lithium air battery may use an aqueous electrolyte or a non-aqueous electrolyte as the electrolyte between the cathode and the anode.

When the non-aqueous electrolyte is used as the electrolyte, for example, the reaction mechanism shown in Reaction Scheme 1 may be used.

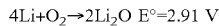

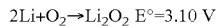                               Reaction Scheme 1

During discharge, lithium derived from the anode combines with oxygen introduced from the cathode to produce a lithium oxide and the oxygen is reduced. During charge, the lithium oxide is reduced and the oxygen is oxidized.

The shape of the lithium air battery is not limited, and may have, for example, a coin shape, a button shape, a sheet shape, a stack shape, a cylindrical shape, a flat shape, a cone shape. The lithium battery may be applied to, e.g., used as, a large battery used in electric vehicles.

Figure 5:
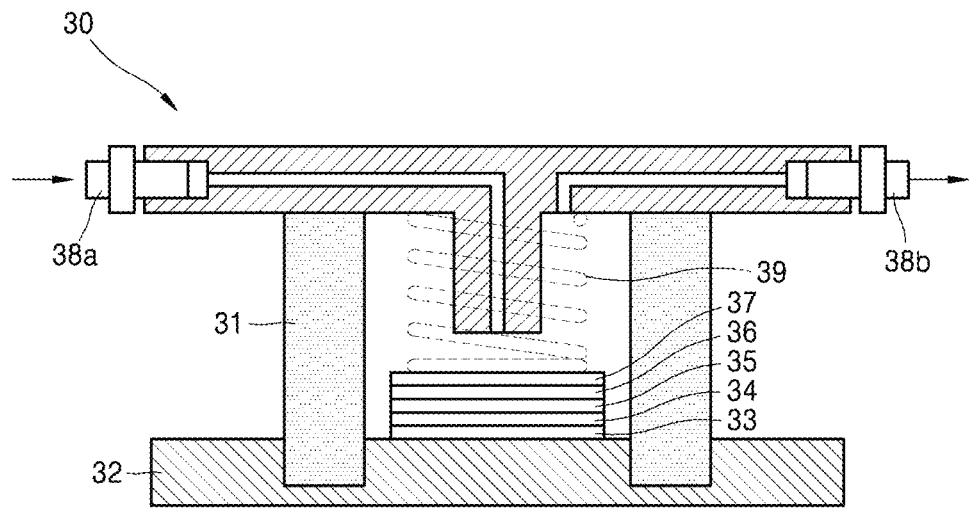
FIG. 5 shows a schematic view of an embodiment of a lithium air battery including a composite membrane.

Referring to FIG. 5, a lithium air battery 30 includes a composite membrane 35 arranged between a cathode 37, using oxygen as an active material, and an anode 33 placed on a substrate 32. An electrolyte 34 is arranged between the anode 33 and the composite membrane 35. The anode 33, the electrolyte 34, and the composite membrane 35 may constitute a protective anode. The electrolyte 34 has excellent lithium ion conductivity and has a small resistance per unit area when combined with the anode 33. In an example of the lithium air battery 30, the lithium air battery 30 may further include a lithium ion conductive solid electrolyte film (not shown) or a separator (not shown) between the anode 33 and the electrolyte 34 or between the electrolyte 34 and the composite membrane 35. The cathode 37 includes a current collector, and a pressing member 39 may be placed on the current collector. The pressing member 39 allows the air to arrive at the cathode 37. A case 31 is placed to surround the cathode 37 and the anode 33. The case 31 includes an insulating resin. The air is supplied through an air inlet 38a and discharged through an air outlet 38b. The term "air" is not limited to atmospheric air, and may include a combination of gases, including oxygen, or pure oxygen gas. An electrolyte 36 is placed between the composite membrane 35 and the cathode 37. In an example of the lithium air battery 30, a lithium ion conductive solid electrolyte membrane (not shown) or a separator (not shown) may be further located between the cathode 37 and the electrolyte 36 or between the electrolyte 36 and the composite membrane 35. The composite membrane 35 may be placed above the surface of the anode 33 to function as a protective film for protecting lithium from the electrolyte 34. The composite membrane 35 may be a monolayer or a multi-layer.

Each of the electrolytes 34 and 36 may be, for example, a polymer solid electrolyte. The polymer solid electrolyte is a poly ethylene oxide doped with lithium salt, and the lithium salt may be, for example, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_2F)_2$, $LiC_4F_9SO_3$, $LiAlCl_4$, or the like.

In an embodiment, each of the electrolytes 34 and 36 may be a liquid electrolyte including a solvent and a lithium salt. The solvent may include at least one of an aprotic solvent, or water. The aprotic solvent may be, for example, a carbonate-based solvent, an ester-based solvent, an ether-based solvent, a ketone-based solvent, an amine-based solvent, or a phosphine-based solvent. The carbonate-based solvent may be, for example, dimethyl carbonate ("DMC"), diethyl carbonate ("DEC"), ethyl methyl carbonate ("EMC"), dipropyl carbonate ("DPC"), methyl propyl carbonate ("MPC"), ethyl propyl carbonate ("EPC"), propylene carbonate ("PC"), or butylene carbonate ("BC"). The ester-based solvent may be, for example, methyl acetate, ethyl acetate, n-propyl acetate, tert-butyl acetate, methyl propionate, ethyl propionate, γ-butyrolactone, decanolide, valerolactone, mevalonolactone, or caprolactone. The ether-based solvent may be, for example, dibutyl ether, tetraglyme, diglyme, dimethoxyethane, 2-methyltetrahydrofuran, or tetrahydrofuran. The ketone-based solvent may be, for example, cyclohexanone. The amine-based solvent may be, for example, triethylamine or triphenylamine. The phosphine-based solvent may be, for example, triethylphosphine. However, the solvents described above are not limited thereto, and any suitable aprotic solvent may be used as the solvent herein. In addition, the aprotic solvent may be, for example, a nitrile, such as R—CN (R is a linear, branched, or cyclic hydrocarbon group having 2 to 30 carbon atoms, and may contain a double bond, an aromatic ring, or an ether bond), an amide, such as dimethylformamide, or a dioxolane, such as 1,3-dioxolane, or a sulfolane.

One or more aprotic solvents may be used. When more than one non-protonic, e.g., aprotic, solvent is used, the mixing ratio of the solvents may appropriately be adjusted according to the performance of a battery.

In an embodiment, each of the electrolytes 34 and 36 includes an ionic liquid. The ionic liquid may be, for example, a linear, branched, substituted ammonium, imidazolium, pyrrolidinium, or a compound constituted of a piperidinium cation and an anion such as $PF_6^-$, $BF_4^-$, $CF_3SO_3^-$, $(CF_3SO_2)_2N^-$, $(C_2F_5SO_2)_2N^-$, $(FSO_2)_2N^-$, or $(CN)_2N^-$.

In an embodiment, each of the electrolytes 34 and 36 may partially or entirely impregnate a cathode or an anode.

In an embodiment, each of the electrolytes 34 and 36 may be a lithium ion conductive solid electrolyte membrane. The lithium ion conductive solid electrolyte membrane may be, for example, lithium ion conductive glass, lithium ion conductivity crystals (ceramic or glass-ceramic), or an inorganic material including the mixture thereof. When chemical stability is taken into consideration, the lithium ion conductive solid electrolyte membrane contains oxides. When the lithium ion conductive solid electrolyte membrane includes lithium ion conductivity crystals in great quantities, high ion conductivity may be obtained. Accordingly, the amount of the lithium ion conductivity crystals may be, for example, based on the total weight of the solid electrolyte membrane, 50 weight percent (wt %) or greater, 55 wt % or greater, or 60 wt % or greater. Lithium ion conductivity crystals may be, for example, a perovskite structure crystal having lithium ion conductivity, such as $Li_3N$, LISICON or $La_{0.55}Li_{0.35}TiO_3$, $LiTi_2P_3O_{12}$ having a NASICON-type structure, or a glass-ceramic that precipitates lithium ion conductivity crystals. Lithium ion conductivity crystals may be, for example, $Li_{1+x+y}(Al_aGa_{1-a})_x(Ti_bGe_{1-b})_{2-x}Si_yP_{3-y}O_{12}$ (wherein $0 \leq x \leq 1$ and $0 \leq y \leq 1$, for example, $0 \leq x \leq 0.4$ and $0 < y \leq 0.6$, or $0.1 \leq x \leq 0.3$ and $0.1 < y \leq 0.4$, $0 \leq a \leq 1$, and $0 \leq b \leq 1$). To have high ion conductivity, lithium ion conductivity crystals need not have the grain boundary that interrupts ion conduction. For example, the glass-ceramic does not have pores or grain boundaries which interrupt ion-conduction, and thus, the glass-ceramic has high ion conductivity and excellent chemical stability. The glass-ceramic, which is lithium ion conductive, may be, for example, lithium-aluminum-germanium-phosphate ("LAGP"), lithium-aluminum-titanium-phosphate ("LATP"), or lithium-aluminum-titanium-silicon-phosphate ("LATSP"). For example, when a mother glass has the composition of $Li_2O$—$Al_2O_3$—$TiO_2$—$SiO_2$—$P_2O_5$ and the mother glass is crystallized by a heat treatment, a main crystal phase is $Li_{1+x+y}Al_xTi_{2-x}Si_yP_{3-y}O_{12}$ (wherein $0 \leq x \leq 2$ and $0 \leq y \leq 3$ and wherein x and y may satisfy the conditions of, for example, $0 \leq x \leq 0.4$, or $0 < y \leq 0.6$, or $0.1 \leq x \leq 0.3$ and $0.1 < y \leq 0.4$). The pore or grain boundary that interrupts ion conduction refers to a material for inhibiting ion conductivity, such as a pore or grain boundary that reduces the conductivity of an inorganic material including lithium ion conductive crystals to at most one tenth of the conductivity of the lithium ion conductive crystals in the inorganic material.

The cathode 37, which uses oxygen as the cathode active material, includes a conductive material. The conductive material may be, for example, porous. Therefore, any suitable conductive material having porosity and conductivity may be used without limitation herein for use as the conductive material.

The conductive material may be, for example, a carbon-based conductive material with porosity. Examples of the carbon-based conductive material are carbon blacks, graphites, graphenes, activated carbons, and carbon fibers. The conductive material may be, for example, a metallic conductive material, such as a metal fiber or a metal mesh. The metallic conductive material may be, for example, metallic powder, such as copper, silver, nickel, or aluminum. In addition, the conductive material may be, for example, an organic conductive material, such as a polyphenylene derivative. At least one conductive material may be used.

In an embodiment, a catalyst for oxidizing/reducing of oxygen may be added to the cathode 37, and the catalyst may be a precious metal-based catalyst, such as platinum, gold, silver, palladium, ruthenium, rhodium, or osmium; an oxide-based catalyst, such as manganese oxide, iron oxide, cobalt oxide, or nickel oxide; or an organometallic catalyst, such as cobalt phthalocyanine. However, the catalyst is not limited thereto, and any suitable material for use as a catalyst for oxidizing/reducing oxygen may be used as the catalyst herein.

In an embodiment, the catalyst may be supported by a carrier. The carrier may be, for example, an oxide, zeolite, clay-based mineral, or carbon. The oxide may be, for example, alumina, silica, zirconium oxide, or titanium dioxide. The oxide may include at least one metal of Ce, Pr, Sm, Eu, Tb, Tm, Yb, Sb, Bi, V, Cr, Mn, Fe, Co, Ni, Cu, Nb, Mo, or W. The carbon may be, for example, carbon black, such as ketjen black, acetylene black, channel black, or lamp black; graphite, such as natural graphite, artificial graphite, or expanded graphite; activated carbon, or carbon fibers. However, the carbon is not limited thereto, and any suitable material for use as carrier may be used as the carbon herein.

In an embodiment, the cathode 37 may additionally include a binder. The binder includes a thermoplastic resin or a thermosetting resin. The binder may be, for example, at least one of polyethylene, polypropylene, polytetrafluoroethylene ("PTFE"), polyvinylidene fluoride ("PVDF"), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoro(methyl vinyl ether)-tetrafluoro ethylene copolymer, or an ethylene-acrylic acid copolymer. However, the binder is not limited thereto, and any suitable material for use as a binder may be used as the binder herein.

In an embodiment, the cathode 37 may be prepared in such a manner that the oxygen oxidizing/reducing catalyst, the conductive material, and the binder are mixed, and then, an appropriate solvent is added to the mixture to prepare cathode slurry, and the cathode slurry is coated and dried on a current collector, or optionally, the mixture may be compression-molded on the current collector to increase the density of an electrode. In an embodiment, the cathode may optionally include a lithium oxide. In an embodiment, the oxygen oxidizing/reducing catalyst may be omitted.

The current collector may include a porous material having, for example, a net shape or a mesh shape, and may be a porous metal plate including, for example, stainless steel, nickel, or aluminum. However, the current collector is not limited thereto, and any suitable material for use as a current collector may be used as the current collector herein. In an embodiment, the current collector may be coated with an oxidation-resistant metal or an alloy coating to prevent oxidation.

As the anode 33 of the lithium air battery 30, an anode including lithium may be an electrode including Li metal, Li metal-based alloy, or a material that intercalates or deintercalates Li. However, the anode including lithium is not limited thereto, and any suitable material for use as an anode and that contains lithium or enable intercalation or deintercalation of lithium may be used as the anode herein. The anode 33 may determine the capacity of the lithium air battery 30. The anode 33 may be, for example, a lithium metal thin film. The lithium metal-based alloy may be, for example, an alloy of lithium and at least one of aluminum, tin, magnesium, indium, calcium, titanium, or vanadium.

In an example of the lithium air battery 30, a separator (not shown) may be placed between the cathode 37 and the anode 33. Any suitable separator may be used herein. The separator should have a composition that endures the use range of a lithium air battery. For example, the separator may be a non-woven polymer fabric, such as a non-woven polypropylene fabric or a non-woven polyphenylene sulfide fabric, or a porous film of an olefin-based resin, such as polyethylene or polypropylene. At least one fabric and at least one porous film may be used.

Since the lithium air battery 30 includes the composite membrane 35, a uniform ion conductivity density is obtained and non-capacity and lifespan characteristics are improved.

Hereinafter, with reference to FIG. 6A to FIG. 6C, the effect that is obtained by employing the composite membrane as described above will be described in further detail.

Figure 6A:
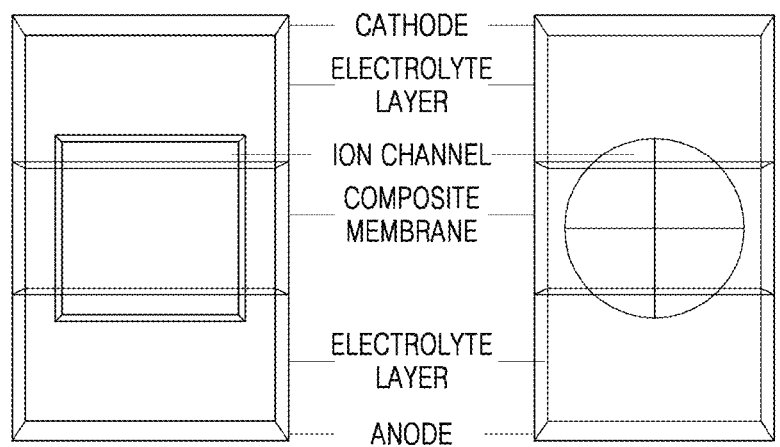
FIG. 6A is a schematic view of a lithium air battery (left) employing an embodiment of a composite membrane; and a lithium air battery (right) employing an embodiment of a composite membrane including a spherical inorganic particle.

FIG. 6A is a schematic view of a lithium air battery (left) employing a composite membrane according to an embodiment and a lithium air battery (right) employing a composite membrane including a spherical inorganic particle, unlike the composite membrane described above; FIG. 6B shows a graph of the ion current density of the lithium air batteries; and FIG. 6C shows a graph of the packing density and ion current density of each of the composite membrane.

Figure 6B:
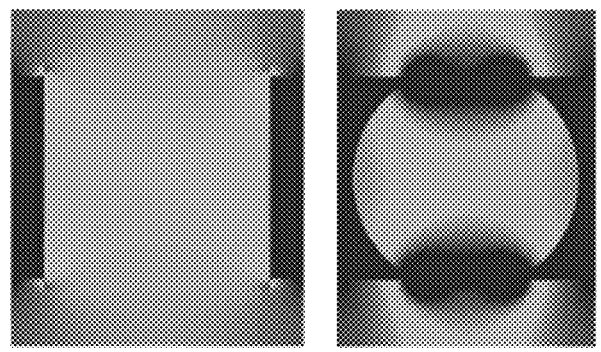
FIG. 6B is an image that shows the ion current density of the lithium air batteries of FIG. 6A.

Referring to FIGS. 6A and 6B, it was confirmed that when a composite membrane according to an embodiment is employed, the ion current density is uniformly distributed, and when the composite membrane including spherical inorganic particles is employed, the ion current density is non-uniformly distributed.

Figure 6C:
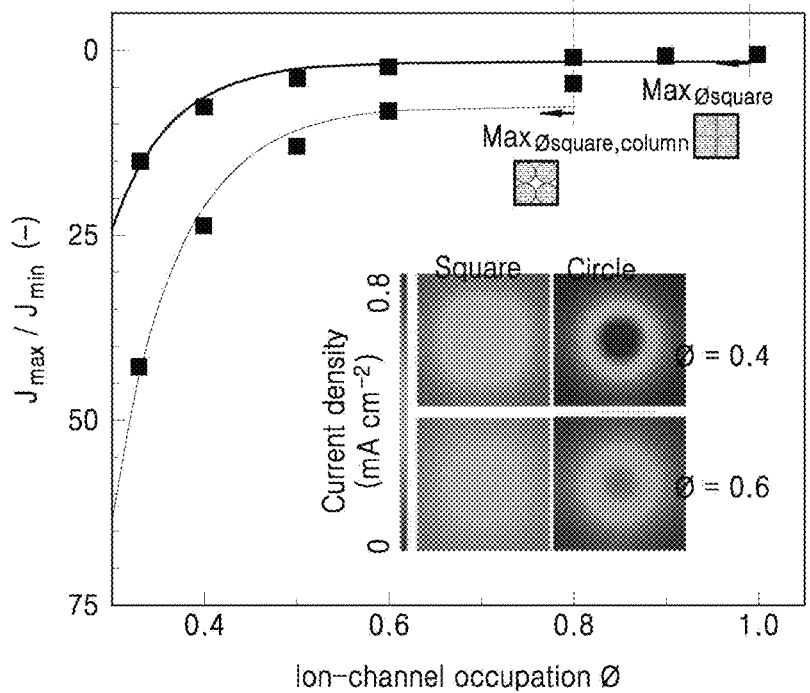
FIG. 6C shows a graph of ion current density uniformity ($J_{max}/J_{min} \times 100\%$) versus inorganic particle packing density (%) for each of the composite membranes.

Referring to FIG. 6C, the composite membrane according to an embodiment has a packing density of inorganic particles therein of up to 100%, and thus exhibits a uniform ion current density, while the composite membrane including the spherical inorganic particles has a packing density of inorganic particles of up to 78%, indicating that the ion current density is non-uniform.

In an embodiment, a lithium battery is an all solid-state battery.

Figure 7:
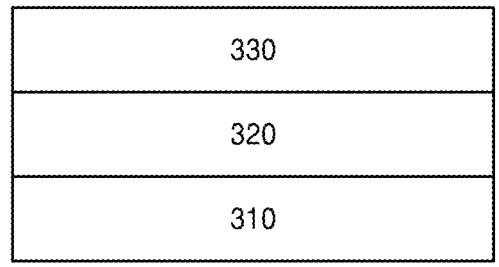
FIG. 7 shows a schematic view of an embodiment of an all solid-state battery including a composite membrane.

Referring to FIG. 7, the lithium battery may include an anode 310, a cathode 330, and an electrolyte layer 320 between the anode 310 and the cathode 330.

When the anode 310 is a metal lithium, the composite membrane may be present in the cathode 330 and/or the electrolyte layer 320.

The cathode 330 may include a cathode active material, the composite membrane, a conductive material, and a binder. A cathode active material that is suitable for solid-state lithium batteries is typically very Li-conductive and exhibit relatively high voltages with respect to metal lithium. In contrast, a cathode active material may be ion non-conductive but electronically conductive.

The anode 310 includes an anode active material and optionally a composite membrane, a conductive material, and a binder material. Examples of the anode active material include, but are not limited to, metal lithium, metal active materials, and carbon active materials. Examples of the metal active materials include In, Al, Si, and Sn. Examples of the carbon active material include mesocarbon microbeads ("MCMB"), highly oriented pyrolytic graphite ("HOPG"), hard carbon, and soft carbon. The conductive material and binder used for the anode active material may be the same as or similar to those contained in the cathode. An example anode current collector material includes copper, nickel, and carbon.

An example of a lithium secondary battery is a lithium sulfur secondary battery or a lithium ion secondary battery. A lithium battery is, for example, a lithium metal battery including lithium metal as an anode.

Figure 8:
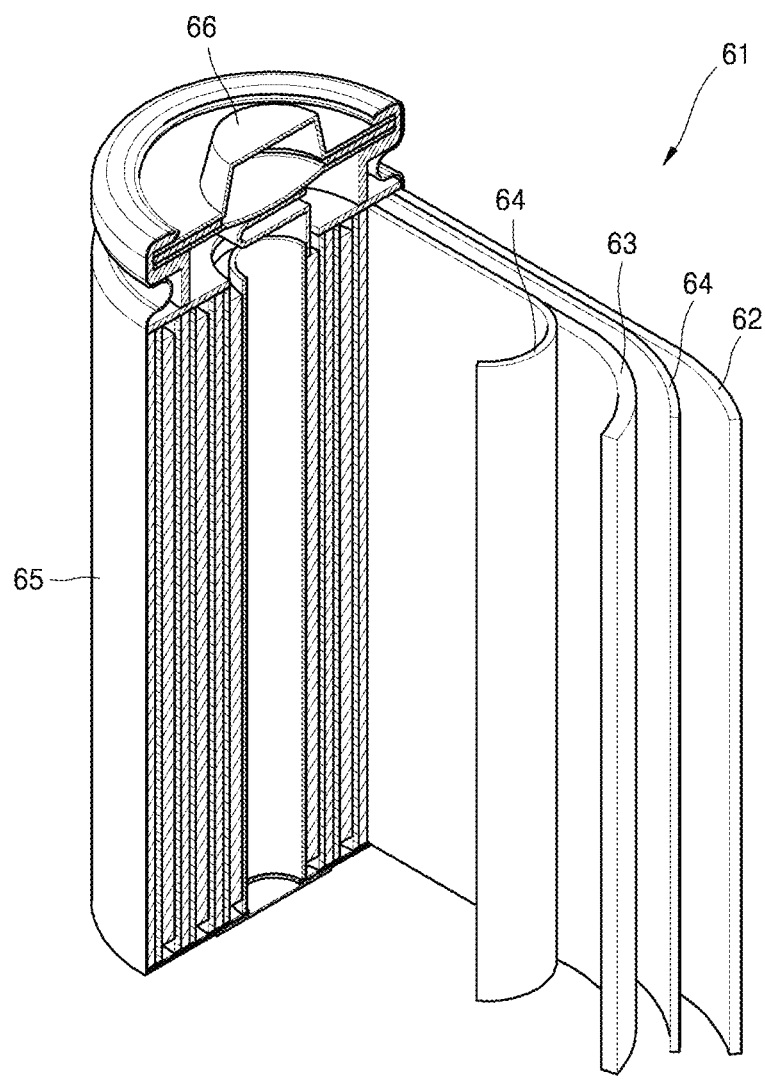
FIG. 8 shows a schematic view of an embodiment of a lithium battery.

Referring to FIG. 8, a lithium ion battery 61 includes a cathode 63, an anode 62, and a separator 64. The cathode 63, the anode 62 and the separator 64 are wound or folded and housed in a battery case 65. An organic electrolytic solution is then injected into the battery case 65 and sealed with a cap assembly 66 to complete the manufacturing of the lithium ion battery 61. The battery case 65 may be cylindrical as shown in FIG. 8 or, for example, square or of thin film type. A lithium battery may be, for example, a thin film battery.

The separator 64 is arranged between the cathode 63 and the anode 62 to form a battery assembly. A plurality of such battery assemblies are stacked in a bi-cell structure, and then, impregnated with an organic electrolytic solution. The result is housed in a pouch and sealed, thereby completing the manufacturing of a lithium ion polymer battery.

In an example of the lithium ion battery 61, the composite membrane (not shown) described above is placed on at least one surface of the anode 62, for example, a lithium metal anode to protect the anode 62.

In the case of a lithium sulfur battery, a carbon material, which reversibly enables intercalation/deintercalation of lithium ions, a material that reacts with lithium ions to reversibly form a lithium-containing compound, or a lithium alloy is used as an anode active material for an anode.

Any suitable carbon-based anode active material for use in lithium sulfur secondary batteries may be used as the carbon material herein. A carbon-based anode active material may be, for example, at least one of crystalline carbon, or amorphous carbon, or a mixture thereof. The material that reacts with lithium ions to reversibly form a lithium-containing compound may be, for example, tin oxide ($SnO_2$), titanium nitride, silicon (Si), or the like. The lithium alloy may be, for example, an alloy of lithium and a metal such as Na, K, Rb, Cs, Fr, Be, Mg, Ca, Sr, Ba, Ra, Al, or Sn.

In a lithium sulfur battery, a cathode active material may be, for example, at least one of elemental sulfur ($S_8$), or an elemental sulfur-containing compound, and the elemental sulfur-containing compound may be, for exam of $Li_2S_n$ (wherein n≥1), $Li_2S_n$ (wherein n≥1) dissolved in catholyte, an organic sulfur compound, or a carbon-sulfur polymer (($C_2S_x)_n$: x=2.5 to 50, n≥2).

In the case of the lithium ion battery, the cathode active material may be, for example, a compound that reversibly enables intercalation and deintercalation of lithium (lithiated intercalation compound). The cathode active material may include, for example, at least one of a lithium cobalt oxide, a lithium nickel cobalt manganese oxide, a lithium nickel cobalt aluminum oxide, a lithium iron phosphate, or a lithium manganese oxide. However, the cathode active material is not limited thereto, and any suitable material for use as a cathode active material may be used as the cathode active material.

The cathode active material may be, for example, a lithium cobalt oxide of Formula $LiCoO_2$; a lithium nickel oxide of Formula $LiNiO_2$; a lithium manganese oxide of Formula $Li_{1+x}Mn_{2-x}O_4$ (wherein x is in the range of 0 to 0.33), $LiMnO_3$, $LiMn_2O_3$, or $LiMnO_2$; a lithium copper oxide of Formula $Li_2CuO_2$; a lithium iron oxide of Formula $LiFe_3O_4$; a lithium vanadium oxide of Formula $LiV_3O_8$; a copper vanadium oxide of Formula $Cu_2V_2O_7$; a vanadium oxide of Formula $V_2O_5$; a lithium nickel oxide of Formula $LiNi_{1-x}M_xO_2$ (wherein M is Co, Mn, Al, Cu, Fe, Mg, B, or Ga, x is in the range of 0.01 to 0.3); a lithium manganese composite oxide of Formula $LiMn_{2-x}M_xO_2$ (wherein M is Co, Ni, Fe, Cr, Zn, or Ta, and x is in the range of 0.01 to 0.1), or $Li_2Mn_3MO_8$ (wherein M is Fe, Co, Ni, Cu, or Zn); a lithium manganese oxide of Formula $LiMn_2O_4$ wherein some Li are substituted with an alkali earth-metal ion; a disulfide compound; or an iron molybdenum oxide of Formula Fee $(MoO_4)_3$.

The anode active material may be, for example, at least one of a carbon-based material, silicon, a silicon oxide, a silicon-based alloy, a silicon-carbon-based material composite, tin, a tin-based alloy, a tin-carbon composite, or a metal oxide. The carbon-based material may be, for example, carbon, graphite or carbon nanotube.

The anode active material for a lithium ion battery may include, for example, at least one of Si, $SiO_x$ (wherein $0<x<2$, for example, 0.5 to 1.5), Sn, $SnO_2$, or a silicon-containing metal alloy. A metal that enables the production of a silicon-containing metal alloy may be, for example, at least one of Al, Sn, Ag, Fe, Bi, Mg, Zn, In, Ge, Pb, or Ti.

The anode active material may include, for example, a metal/metalloid alloy capable of alloying with a lithium, or an alloy or oxide thereof. For example, the metal/metalloid alloy capable of alloying with a lithium, and the alloy or oxide thereof may be at least one of Si, Sn, Al, Ge, Pb, Bi, SbSi—Y' alloy (wherein Y' is at least one of an alkali metal, an alkaline earth metal, a Group 13 element to a Group 16 element, a transition metal, or a rare earth element, and is not Si), Sn—Y' alloy (wherein Y' is at least one of an alkali metal, an alkaline earth metal, a Group 13 element to a Group 16 element, a transition metal, or a rare earth element and is not Sn), or $MnO_x$ (wherein $0<x\leq2$). The element Y may be at least one of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, or Po.

An oxide of the metal/metalloid alloy capable of alloying with a lithium may be, for example, a lithium titanium oxide, a vanadium oxide, a lithium vanadium oxide, $SnO_2$, or $SiO_x$ (wherein $0<x<2$).

An example of the anode active material includes, for example, at least one of a Group 13 element, a Group 14 element, or a Group 15 element, wherein "Group" refers to a Group of the Periodic Table of Elements. The anode active material may include, for example, at least one of Si, Ge, or Sn.

An example of the anode active material is a mixture of a carbon-based material and silicon, silicon oxide, a silicon-containing metal alloy, or a composite of a carbon-based material and at least one of silicon, silicon oxide, or a silicon-containing metal alloy.

The anode active material may be, for example, simple nanoparticles or a nano-sized nanostructure. For example, the anode active material has various nanostructures, such as nanoparticles, nanowires, nanorods, nanotubes, and nanobelts.

A separator between a cathode and an anode may have a mixed multi-layer structure, such as a two-layered separator having the structure of polyethylene/polypropylene, a three-layer separator having the structure of polyethylene/polypropylene/polyethylene, or a three-layer separator having the structure of polypropylene/polyethylene/polypropylene.

An electrolytic solution for a lithium ion battery includes an organic solvent and a lithium salt.

The organic solvent may include, for example, at least one of benzene, fluorobenzene, toluene, dimethylformamide, dimethylacetate, trifluoro toluene, xylene, cyclohexane, tetrahydrofuran, 2-methyltetrahydrofuran, cyclohexanone, ethanol, isopropyl alcohol, dimethyl carbonate, ethyl methyl carbonate, diethyl carbonate, methyl propyl carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, or sulfolane.

The lithium salt may include, for example, at least one lithium salt, such as at least one of lithium hexafluorophosphate ($LiPF_6$), lithium tetrafluoroborate ($LiBF_4$), lithium hexafluoroazenate ($LiAsF_6$), lithium perchlorate ($LiClO_4$), lithium trifluoromethane sulfonate ($LiSO_3CF_3$), lithium bis(trifluoromethylsulfonyl)imide ($LiN(SO_2CF_3)_2$), or lithium bis(perfluoroethylsulfonyl)imide ($LiN(SO_2C_2F_5)_2$).

The concentration of lithium salt in an electrolytic solution may be, for example, in the range of about 0.01 M to about 5 M, or about 0.1 M to about 2.0 M.

In the lithium battery such as the lithium sulfur battery and the lithium ion battery described above, a lithium anode is protected, and thus the side reaction between the lithium anode and an electrolytic solution is suppressed, and the lithium ion conductivity is improved, leading to an improvement in conductivity and lifetime characteristics.

An aspect of an embodiment provides a method of producing a conductive array that includes: forming a plurality of openings in a substrate; filling the openings with precursors of a plurality of ion conductive inorganic particles; heat treating the substrate filled with the ion conductive inorganic particles; and transferring the ion conductive inorganic particles to form the conductive array.

Ion conductive inorganic particles may be milled into fine particles and then placed, e.g., used. Thus, the shape and size of each inorganic particle may be random, and even when the surface of the inorganic particle is polished to form a rod-shape, it may not be easy to increase the density of particles, due to non-uniform intervals of the particles.

According to the method of manufacturing a conductive array according to an embodiment, openings are formed on a substrate to have a pattern of a desired shape, the openings are filled with a precursor of an inorganic particle, and heat treating is performed on the resultant structure. By doing so, inorganic particles may be controlled to have a target size and shape, leading to enabling the manufacture of a highly dense packed conductive array.

Figure 9:
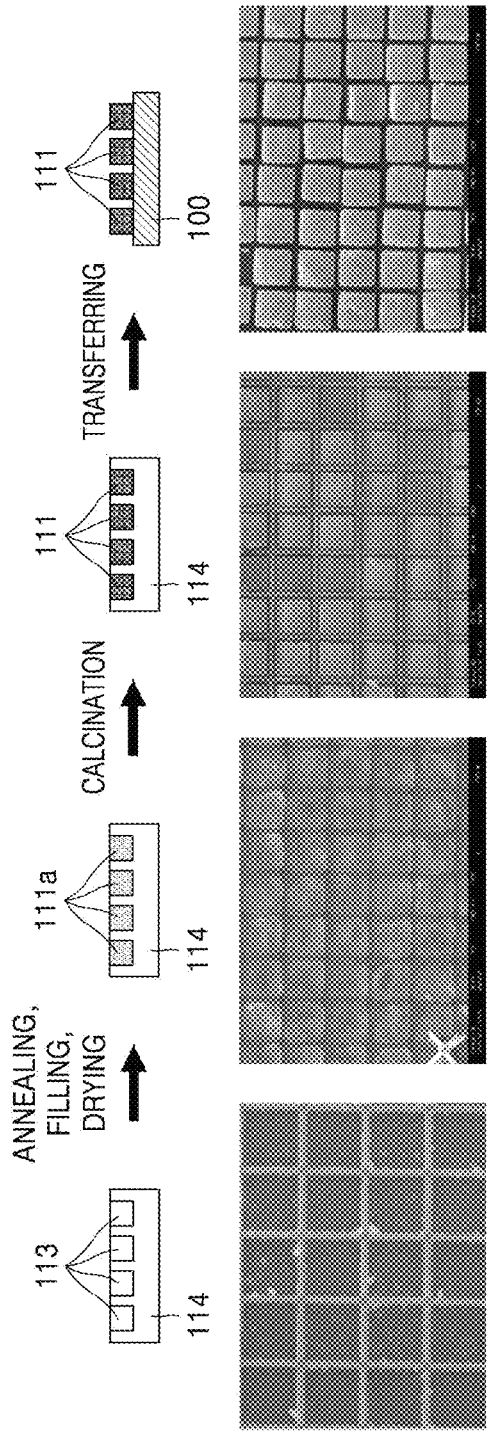
FIG. 9 shows a flowchart illustrating a method of manufacturing a conductive array, according to an embodiment.

Referring to FIG. 9, a plurality of openings 113 are formed on a substrate 114. The substrate 114 may be a silicon-based material. The substrate 114 may be, for example, a silicon oxide having a melting point of 1,100° C. or higher, but is not limited thereto. The substrate 114 may be, for example, $SiO_2$.

The method of forming the openings 113 is not particularly limited. In an embodiment, the method of forming the openings 113 may be micropatterning.

The plurality of openings 113 are filled with a solution in which a precursor 111a of ion conductive inorganic particles is dispersed in a solvent. If needed, the resultant substrate is dried, and then the surface thereof is uniformly wiped off.

Then, the surface of the substrate 114 filled with the precursor 111a is calcined at a temperature of about 800° C. to about 1,500° C. for about 1 hour to about 12 hours to form ion conductive inorganic particles 111.

Subsequently, only the ion conductive inorganic particles 111 are transferred by using, for example, an adhesive tape 115 to form the conductive array 100 in which the ion conductive inorganic particles 111 are regularly arranged.

Heat treatment depends on the type of ion conductive inorganic particles. For example, the heat treatment may be performed at a temperature of about 800° C. to about 1,500° C., or about 900° C. to about 1,200° C.

The present disclosure will be explained in more detail through the following Examples and Comparative Examples. However, Examples are provided herein for illustrative purpose only, and do not limit the scope of the present disclosure.

Manufacture of Conductive Array

Precursor Synthesis Method 3.4 milliliters (ml) of titanium butoxide and 45 ml of water were added to a mixture including 5 ml of ethanol and 5 ml of acetone, and the resultant mixture was stirred for 30 minutes. Then, 0.77 grams (g) of $CH_3COOLi.H_2O$, 2.01 g of $NH_4H_2PO_4$, and 0.66 g of $AlNO_3.9H_2O$ were added to the mixture and stirred for 3 hours. Then, $NH_4NO_3$ was added to the mixture and stirred in a high-pressure reactor at a temperature of 180° C. for 10 hours. The obtained precipitate was dried in an oven at a temperature of 80° C. and then sintered in a furnace at a temperature of 1,300° C. for 2 hours to obtain a precursor of lithium-aluminum-titanium-phosphate ("LATP": $Li_{1.4}Al_{0.4}Ti_{1.6}P_3O_{12}$).

Preparation Example 1

A silicon substrate was micro-patterned such that a plurality of hexagonal openings each have top and bottom square surfaces, a width of 50 micrometers (μm), a length of 50 μm, and a height of 36 μm were spaced from each other at intervals of 5 μm. The silicon substrate was heat treated at a temperature of 1,000° C. for 6 hours.

The openings of the silicon substrate were filled with 700 μl of the precursor of lithium-aluminum-titanium-phosphate ("LATP": $Li_{1.4}Al_{0.4}Ti_{1.6}P_3O_{12}$) dispersed in an ethanol solution (100 milligrams per milliliter (mg/ml)), and then, dried for 1 hour. The surface of the resultant substrate was pressed by using a roller while a polytetrafluoroethene sheet was placed therebetween, followed by being uniformly wiped with a Kim Wipe®.

Subsequently, the silicon substrate was sintered at a temperature of 1,000° C. for 6 hours, and then transferred onto an adhesive tape having an area of 5 centimeters (cm)×5 cm to prepare a conductive array. In this regard, the circumference of each of the top and bottom surfaces of inorganic particles arranged on a conductive array divided by the width thereof was 4.

Figure 10A:
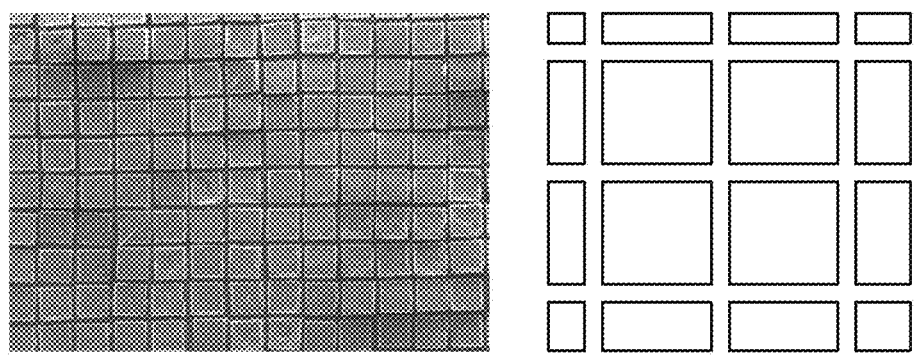
FIGS. 10A to 10D show a scanning electron microscope ("SEM") image and a schematic view of each of the conductive arrays prepared in Preparation Examples 1 and 4, respectively; Comparative Preparation Examples 1 and 2, respectively.

FIG. 10A shows a scanning electron microscope ("SEM") image and schematic view of the manufactured conductive array.

Preparation Example 2

A conductive array was manufactured in the same manner as in Preparation Example 1, except that each of the openings has were spaced apart from each other at the interval of 10 μm and has a hexahedron shape having a width of 100 μm, a length of 100 μm, and a height of 36 μm. In this regard, the circumference of each of the top and bottom surfaces of inorganic particles arranged on a conductive array divided by the width thereof was 4.

Preparation Example 3

A conductive array was manufactured in the same manner as in Preparation Example 1, except that each of the openings has were spaced apart from each other at the interval of 10 μm and has a hexahedron shape having a width of 100 μm, a length of 100 μm, and a height of 36 μm. In this regard, the circumference of each of the top and bottom surfaces of inorganic particles arranged on a conductive array divided by the width thereof was 4.

Preparation Example 4

A conductive array was manufactured in the same manner as in Preparation Example 1, except that openings of the conductive array each have a polygonal shape having an arrow-shaped top and bottom surfaces, a width of 150 μm, and a height of 36 μm, wherein the intervals of the openings are 10 μm. In this regard, the circumference of each of the top and bottom surfaces of inorganic particles arranged on a conductive array divided by the width thereof was 3.2.

Figure 10B:
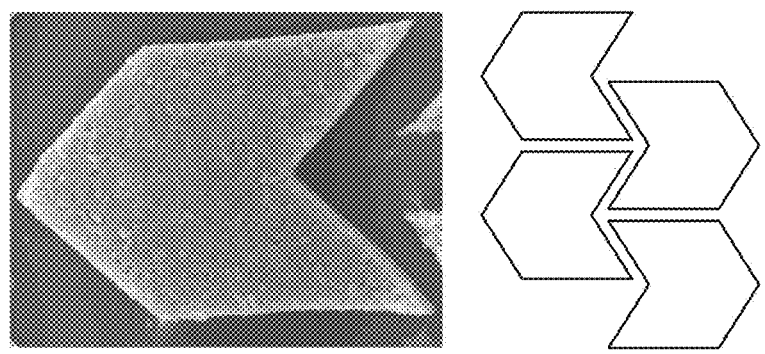

FIG. 10B shows a SEM image and a schematic view of the manufactured conductive array.

Preparation Example 5

A conductive array was manufactured in the same manner as in Preparation Example 3, except that the precursor of lithium-aluminum-gallium-phosphate ("LAGP": $Li_{1.4}Al_{0.4}Ge_{1.6}P_3O_{12}$) was used instead of lithium-aluminum-titanium-phosphate ("LATP": $Li_{1.4}Al_{0.4}Ti_{1.6}P_3O_{12}$). In this regard, the circumference of each of the top and bottom surfaces of inorganic particles arranged on a conductive array divided by the width thereof was 4.

Preparation Example 6

A conductive array was manufactured in the same manner as in Preparation Example 3, except that the precursor of lithium cobalt oxide ("LCO": $LiCoO_2$) was used instead of lithium-aluminum-titanium-phosphate ("LATP": $Li_{1.4}Al_{0.4}Ti_{1.6}P_3O_{12}$). In this regard, the circumference of each of the top and bottom surfaces of inorganic particles arranged on a conductive array divided by the width thereof was 4.

Preparation Example 7

A conductive array was manufactured in the same manner as in Preparation Example 3, except that the precursor of lithium titanium oxide ("LTO": $Li_4Ti_5O_{12}$) was used instead of lithium-aluminum-titanium-phosphate ("LATP": $Li_{1.4}Al_{0.4}Ti_{1.6}P_3O_{12}$). In this regard, the circumference of each of the top and bottom surfaces of inorganic particles arranged on a conductive array divided by the width thereof was 4.

Comparative Preparation Example 1

Particles (average particle diameter: 42 μm) of commercially available lithium-aluminum-titanium-phosphate ("LATP": $Li_{1.4}Al_{0.4}Ti_{1.6}P_3O_{12}$) (manufactured by Toshima Seisakusho) were arranged as high density as possible on a double-sided tape.

Figure 10C:
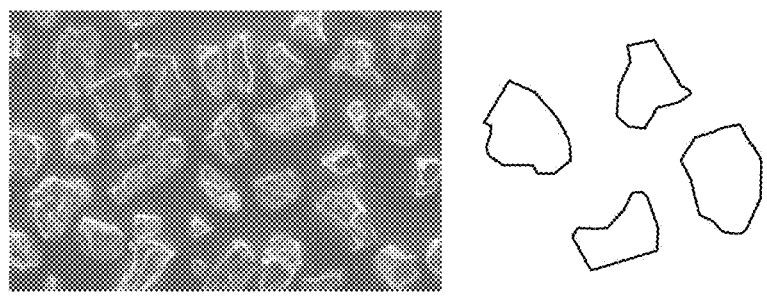

FIG. 10C shows a SEM image and a schematic view of the manufactured conductive array.

Comparative Preparation Example 2

A lithium-aluminum-titanium-phosphate ("LATP": $Li_{1.4}Al_{0.4}Ti_{1.6}P_3O_{12}$) film (Ohara glass, Ohara corporation) was ground, and then, the obtained result was sieved through a sieve having a pore diameter of about 63 μm and a sieve having a pore diameter of about 53 μm to obtain about LTAP particles having a size (average diameter) of 100 μm to 150 μm, respectively. LATP particles were spread on an adhesive tape having an area of 5×5 square centimeters (cm²) to fix LATP particles. The LATP particles were polished to have a height of 70 μm, thereby completing the preparation of a conductive array.

Figure 10D:
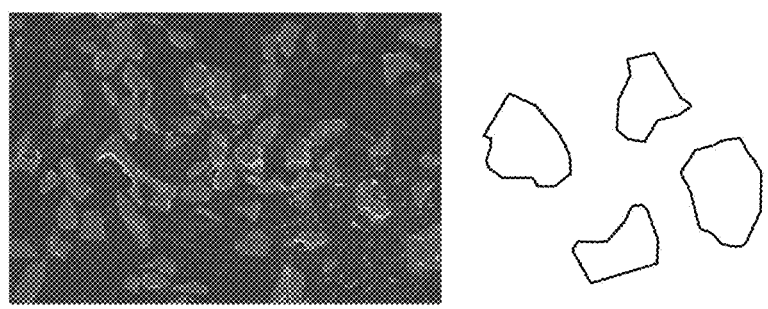

FIG. 10D shows an SEM image and a schematic view of the manufactured conductive array.

Manufacturing of Lithium Air Battery

Example 1

Preparation of Separator

The conductive array prepared in Preparation Example 1 was attached on a water-soluble double-sided tape and transferred to a substrate, and then the mixture of monomers 200 milligrams (mg) of (1,3,5-triallyl-1,3,5-triazinane-2,4,6-trione ("TTT") and 300 mg of pentaerythritol tetrakis(3-mercaptopropionate) ("4T") was dissolved in 2.8 g of dichloroethane to prepare a 15 weight percent (wt %) solution. Then, the solution was cast on the substrate on which the particles had been transferred. After the solution was dried, the monomer was irradiated with UV light to cure the water-soluble double-faced tape to obtain a separator.

Manufacturing of Lithium Air Battery

Multi-walled carbon nanotubes (Nanocyl Inc.), N,N-diethyl-N-methyl-N-(2-methoxyethyl)ammonium bis(trifluoromethylsulfonyl)imide ("DEME-TFSI") containing 1 molar (M) lithium bis(trifluoromethylsulfonyl imide) ("LiTFSI"), which is an ionic liquid, and polyvinylidene fluoride were mixed at a weight ratio of 5:25:1 to prepare a sheet-form cathode. The sheet-form cathode was cut to obtain a cathode in the form of a disc having a diameter of 8 millimeters (mm).

For use as a cathode electrolyte, 1 M lithium bis(trifluoromethylsulfonyl imide)-containing N, N-diethyl-N-methyl-N-(2-methoxyethyl)ammonium bis(trifluoromethylsulfonyl)imide ("DEME-TFSI") electrolyte was used.

A lithium metal (thickness: 500 μm) disc having a diameter of about 15 mm was used as an anode.

A polymer electrolyte disk was used as an anode electrolyte. 2 g of polyethylene oxide, 0.31 g of silica gel, and 0.26 g of LiTFSI were dissolved in 50 ml of acetonitrile, and mixed for 7 hours to obtain a polymer solution. The polymer solution was cast in a polytetrafluoroethene dish and dried to obtain a polymer electrolyte film having a thickness of about 190 μm. The resulting polymer film was punched to obtain a polymer electrolyte disk having a diameter of about 15 mm.

A copper thin film, the lithium metal disc, the polymer electrolyte disc, the composite membrane manufactured as described above, the cathode electrolyte, the cathode, and a gas diffusion layer 35BA (SGL group) were assembled and sequentially stacked to manufacture a lithium air battery.

Examples 2 to 7 and Comparative Examples 1 and 2

Composite membranes and lithium air batteries were manufactured in the same manner as in Example 1, except that the conductive arrays prepared according to Preparation Examples 2 to 7 and Comparative Preparation Examples 1 and 2 were used instead of the conductive array manufactured according to Preparation Example 1.

The specification of the composite membranes used in Examples 1 to 7 and Comparative Examples 1 and 2 are shown in Table 1.

TABLE 1

| | Inorganic particles | Substrate | Bottom Shape | Width | Width distribution | Intervals of particles | Circ./width | Height | Occupancy (%) | Current nonuniformity $J_{max}/J_{min}$ | Resistance |
|---|---|---|---|---|---|---|---|---|---|---|---|
| Example 1 | LATP | Patterned | Square | 50 μm | ±2% | 50 μm | 4 | 36 μm | 81% | 1.2 | — |
| Example 2 | LATP | Patterned | Square | 100 μm | ±2% | 10 μm | 4 | 36 μm | 80% | 1.3 | 915 Ωcm² |
| Example 3 | LATP | Patterned | Square | 200 μm | ±2% | 20 μm | 4 | 36 μm | 82% | 1.2 | — |
| Example 4 | LATP | Patterned | Arrow shape | 150 μm | ±2% | 10 μm | 3.2 | 36 μm | 80% | 1.3 | — |
| Example 5 | LAGP | Patterned | Square | 200 μm | ±2% | 20 μm | 4 | 36 μm | 80% | 1.3 | — |
| Example 6 | LCO | Patterned | Square | 200 μm | ±2% | 20 μm | 4 | 36 μm | 80% | 1.3 | — |
| Example 7 | LTO | Patterned | Square | 200 μm | ±2% | 20 μm | 4 | 36 μm | 80% | 1.3 | — |
| Comparative Example 1 | LATP | Non-Patterned | Random | average 42 μm | ±27% | <40 μm | 2.5~4 | 32 μm | 42 μm | 23 | 1450 Ωcm² |
| Comparative Example 2 | LATP | Non-Patterned | Random | average 65 μm | ±56% | <140 μm | 2~4 | 70 μm | 23% | 76 | — |

Evaluation Example 1: Cell Impedance Measurement

A polypropylene separator (the product of SK innovation Incorporation) impregnated with 100 μl of 1 M electrolytic solution of LiTFSI dissolved in a propylenecarbonate ("PC") solvent was stacked on facing surfaces of each of the composite membranes prepared according to Examples 2 and Comparative Examples 1 and 2. Li electrodes (diameter (φ)=8 mm) were stacked on the two separators laminated on the surfaces of the composite membrane to prepare a measurement cell. The cell impedance of the measurement cell was measured from 1 megahertz (MHz) to 1 hertz (Hz), and the results are shown in FIGS. 11A and 11B.

Figure 11A:
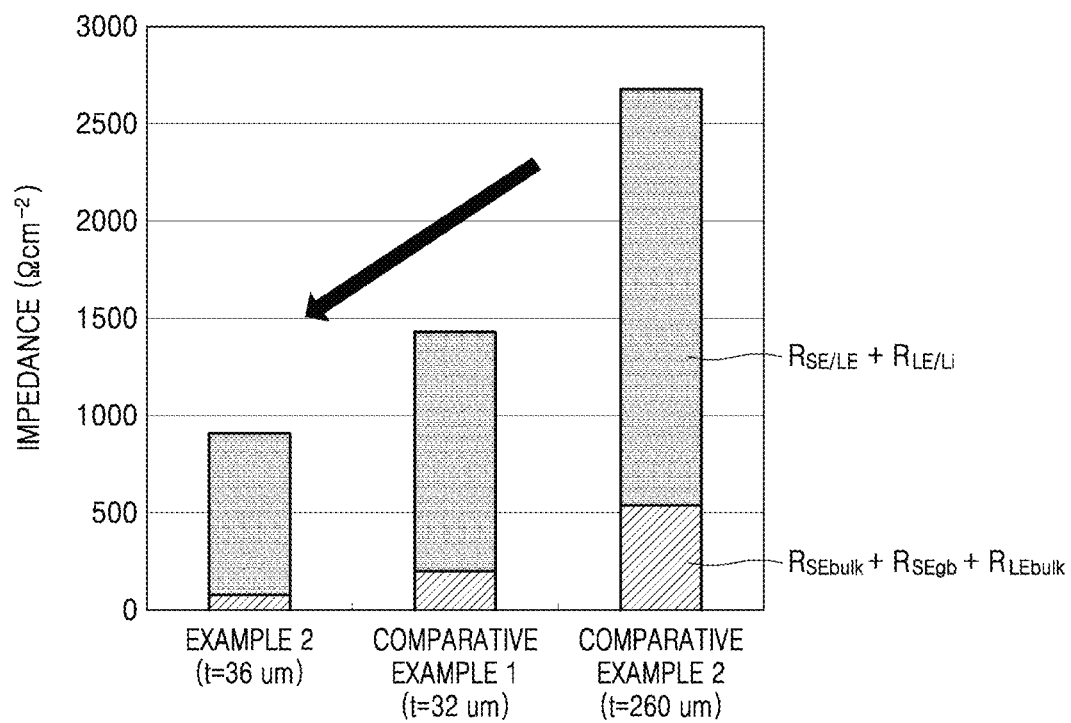
FIG. 11A is a graph of cell impedance (ohms per square centimeter ($\Omega$ cm$^{-2}$)) showing the results of impedance analysis on the lithium ion batteries manufactured in Example 2 and Comparative Examples 1 and 2, wherein $R_{SEbulk}$ is the solid electrolyte bulk resistance, $R_{SEgb}$ is the solid electrolyte grain boundary resistance, and $R_{LEbulk}$ is the liquid electrolyte bulk resistance.
Figure 11B:
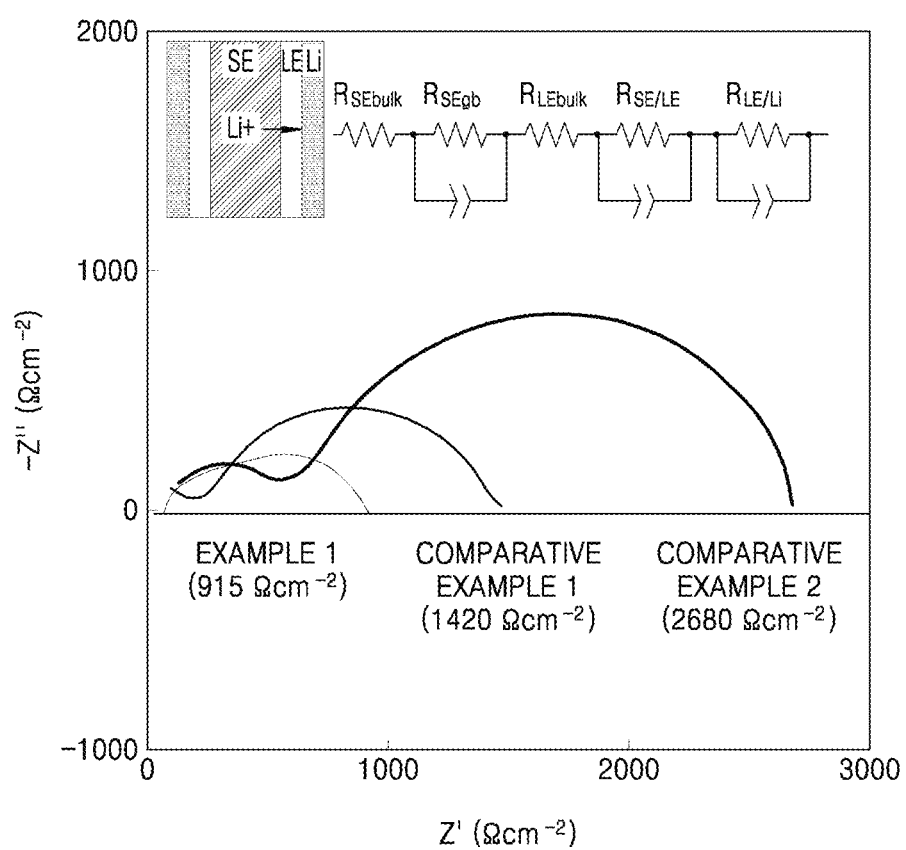
FIG. 11B is a graph of imaginary resistance (−Z", $\Omega$ cm$^{-2}$) versus real resistance (Z', $\Omega$ cm$^{-2}$) illustrating the results of impedance analysis of the lithium ion batteries manufactured in Example 2 and Comparative Examples 1 and 2, wherein which $R_{SEbulk}$ refers to a bulk resistance of the solid electrolyte, $R_{SEgb}$ refers to a resistance of the solid electrolyte grain boundary, $R_{LEbulk}$ refers to a bulk resistance of the liquid electrolyte, $R_{SE/LE}$ refers to a resistance at an interface between the solid electrolyte and the liquid electrode, and $R_{LE/Li}$ refers to a resistance at an interface between the liquid electrode and lithium.

Referring to FIGS. 11A and 11B, it can be seen that the surface resistance is significantly reduced in the case of Example 2, as compared with Comparative Examples 1 and 2.

This is presumably due to the high occupancy percent and low height of the inorganic particles in the composite membrane used in Example 2.

Evaluation Example 2: Charging and Discharging Characteristics Evaluation of Lithium Air Battery The lithium air batteries manufactured according to Example 2 and Comparative Example 1 were placed in a chamber in which the temperature was maintained at about 60° C. under an oxygen atmosphere. The lithium air batteries were discharged at a constant current mode (CC mode) of 0.24 milliamperes per square centimeter (mA/cm²) at an oxygen pressure of 1 atmosphere (atm).

The discharge capacity cut-off voltage of the lithium ion batteries was fixed at 0.5 volts (V).

Figure 12A:
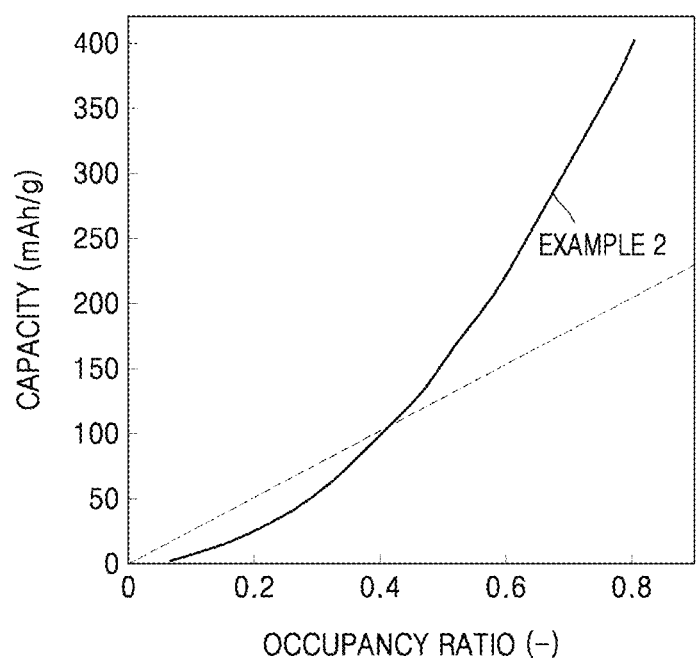
FIG. 12A is a graph of capacity (milliampere hours per gram (mAh/g)) versus occupancy ratio showing charge-discharge characteristics of the lithium air battery of Example 2 and Comparative Example 1.
Figure 12B:
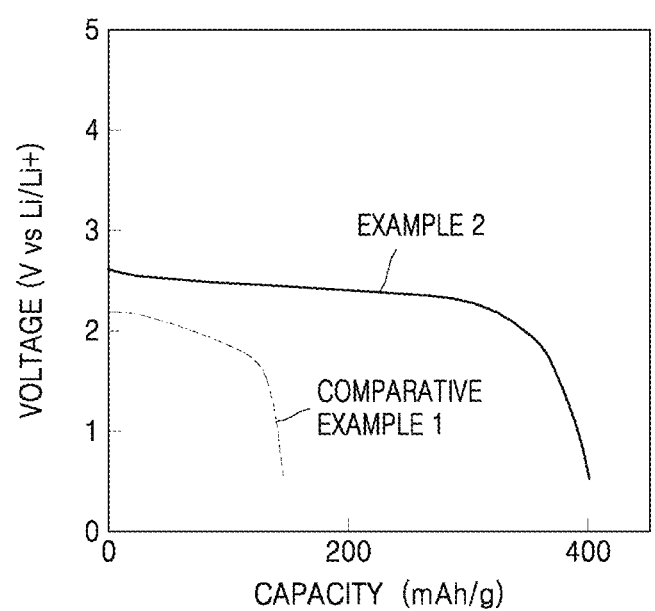
FIG. 12B is a graph of voltage (volts (V) versus Li/Li$^+$) versus capacity (mAh/g) showing the charge-discharge characteristics of the lithium air batteries of Example 2 and Comparative Example 1.

Charging and discharging characteristics of the lithium-ion battery are shown in FIGS. 12A and 12B.

As shown in FIGS. 12A and 12B, it can be seen that the capacity of the lithium air battery manufactured in Example 2 is increased non-linearly.

This is assumedly due to the fact that the current density at the anode interface where the composite membrane is applied has a great influence on the capacity of the lithium air batteries. That is, the lithium ion battery of Example 2, which employs a composite membrane with a uniform current density, appears to exhibit excellent capacity characteristics.

Evaluation Example 3: Charging and Discharging Characteristics Evaluation of Lithium Air Battery The tensile strength and yield strain of the composite membranes manufactured according to Example 2 and Comparative Example 1 were measured by using Universal Test Machine (Lloyd instruments an Ametek company LR5KPlus). Some of the results are shown in FIG. 13.

Figure 13:
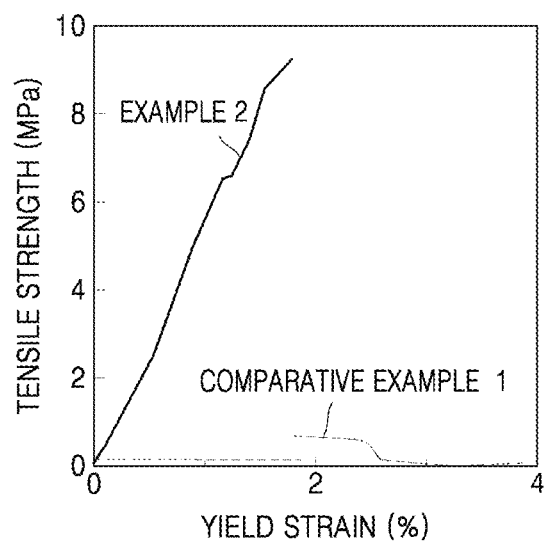
FIG. 13 is a graph of tensile strength (megaPascals (MPa) versus yield strain (percent (%) showing results obtained by measuring the tensile strength and yield strain of the composite membranes manufactured in Example 2 and Comparative Example 1 by using a Universal Test Machine (Intron 5565).

As can be seen from FIG. 13, the composite membrane prepared according to Example 2 shows a significant increase in mechanical strength as compared to that of Comparative Example 1.

According to an aspect, the conductive array according to an embodiment includes regularly arranged and densely packed ion conductive inorganic particles. Due to this structure, the conductive array may realize uniform ion current density and increased capacity.

According to an aspect, the mechanical strength of the composite membrane including the conductive array is improved.

According to an aspect, the method of manufacturing the conductive array according to the present disclosure may provide a conductive array in which various shapes of ion conductive inorganic particles are regularly, uniformly arranged.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite membrane comprising
a conductive array comprising a plurality of ion conductive inorganic particles spaced apart from each other, wherein
a circumference and a width of a surface of each ion conductive inorganic particle included in the conductive array satisfies Inequality (1)

$x \geq 3.2y$, wherein $x$ is a circumference and $y$ is a width, and  Inequality (1)

wherein a distance between a first ion conductive inorganic particle of the plurality of ion conductive inorganic particles and a second ion conductive inorganic particle, which is adjacent to the first ion conductive inorganic particle in a plan view, is 0% to about 20% of the width of the surface of the first ion conductive inorganic particle,
wherein the plurality of ion conductive inorganic particles comprises at least nine ion conductive inorganic particles, and
wherein the ion conductive inorganic particles are regularly, uniformly arranged; and
an organic material between the plurality of ion conductive inorganic particles.

2. The composite membrane of claim 1, wherein
the ion conductive inorganic particles are three-dimensional particles having a height perpendicular to the surface of greater than 0 millimeter.

3. The composite membrane of claim 2, wherein
at least two ion conductive inorganic particles of the plurality of ion conductive inorganic particles have a same height.

4. The composite membrane of claim 1, wherein
at least two ion conductive inorganic particles of the plurality of ion conductive inorganic particles have a top surface and a bottom surface opposite the top surface.

5. The composite membrane of claim 4, wherein
the top surface and the bottom surface of each of the first ion conductive inorganic particle and the second ion conductive inorganic particle of the plurality of ion conductive inorganic particles have a same shape and a same surface area.

6. The composite membrane of claim 4, wherein
a surface area of a top surface and a bottom surface of the first ion conductive inorganic particle and a surface area of a top surface and a bottom surface of the second ion conductive inorganic particle of the plurality of ion conductive inorganic particles are different.

7. The composite membrane of claim 1, wherein
the width (y) is a maximum width of the ion conductive inorganic particle of the plurality of ion conductive inorganic particles in the plan view.

8. The composite membrane of claim 1, wherein
a total top surface area of the plurality of ion conductive inorganic particles in the plan view is equal to greater than about 80% of a total bottom surface area of the conductive array, the plurality of ion conductive inorganic particles each have a bottom surface which is opposite the top surface of each ion conductive inorganic particle of the plurality of ion conductive inorganic particles in the plan view, and
a total bottom surface area of the plurality of ion conductive inorganic particles is equal to or greater than about 80% of a total bottom surface area of the conductive array in the plan view.

9. The composite membrane of claim 1, wherein
the width of each of the plurality of ion conductive inorganic particles is about 98% to about 102% of an average width of the ion conductive inorganic particles of the plurality of ion conductive inorganic particles.

10. The composite membrane of claim 1, wherein
the plurality of ion conductive inorganic particles comprise least one of a glass active metal ion conductor, an amorphous active metal ion conductor, a ceramic active metal ion conductor, or a glass-ceramic active metal ion conductor.

11. The composite membrane of claim 1, wherein the plurality of ion conductive inorganic particles comprise at least one of $Na_{1+x}Zr_2Si_xP_{3-x}O_{12}$, wherein $0<x<3$, $Li_{1+x+y}Al_xTi_{2-x}Si_yP_{3-y}O_{12}$, wherein $0<x<2$, $0 \leq y<3$, $BaTiO_3$, $Pb(Zr_aTi_{1-a})O_3$, wherein $0 \leq a \leq 1$, $Pb_{1-x}La_xZr_{1-y}Ti_yO_3$, wherein $0 \leq x < 1$ $0 \leq y < 1$, and $0 \leq a \leq 1$, $Pb(Mg_3Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, $Li_3PO_4$, $Li_xTi_y(PO_4)_3$, wherein $0 < x < 2$ and $0 < y < 3$, $Li_xAl_yTi_z(PO_4)_3$, wherein $0 < x < 2$, $0 < y < 1$, and $0 < z < 3$, $Li_{1+x+y}(Al_aGa_{1-a})_x(Ti_bGe_{1-b})_{2-x}Si_yP_{3-y}O_{12}$, wherein $0 \leq x \leq 1$, $0 \leq y \leq 1$, $0 \leq a \leq 1$, and $0 \leq b \leq 1$, $Li_xLa_yTiO_3$, wherein $0 < x < 2$ and $0 < y < 3$, $Li_xGe_yP_zS_w$, wherein $0 < x < 4$, $0 < y < 1$, $0 < z < 1$, and $0 < w < 5$, $Li_xN_y$, wherein $0 < x < 4$ and $0 < y < 2$, $SiS_2$, $Li_xSi_yS_z$, wherein $0 < x < 3$, $0 < y < 2$, $0 < z < 4$, $Li_xP_yS_z$, wherein $0 < x < 3$, $0 < y < 3$, and $0 < z < 7$, $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$ ceramic, a Garnet ceramic, or $Li_{3+x}La_3M_2O_{12}$, wherein M is Te, Nb, or Zr and x is an integer of 1 to 10.

12. The composite membrane of claim 1, wherein
the composite membrane is a foldable, flexible membrane.

13. The composite membrane of claim 1, wherein
the composite membrane has a tensile strength of equal to or greater than about 1 megaPascal, and a yield strain of equal to or greater than about 1%.

14. The composite membrane of claim 1, wherein
the composite membrane has a surface having a sea-island structure in which the plurality of ion conductive inorganic particles are discontinuously arranged in a continuous organic film comprising an organic material, or the composite membrane has a cross section having a structure in which the ion conductive inorganic particles are alternately aligned with regions of the organic film.

15. The composite membrane of claim 1, wherein
an amount of the plurality of ion conductive inorganic particles is from about 10 parts by weight to about 90 parts by weight, based on the total weight of 100 parts by weight of the composite membrane.

16. A lithium battery comprising the composite membrane of claim 1.

17. The lithium battery of claim 16, wherein
the lithium battery is an all-solid-state battery or a lithium-air battery.

18. A method of manufacturing the composite membrane of claim 1, the method comprising:
forming a plurality of openings in a substrate;
filling the openings of the substrate with precursors of a plurality of ion conductive inorganic particles;
heat-treating the substrate filled with the plurality of ion conductive inorganic particles; and
transferring the ion conductive inorganic particles to form the conductive array.

19. The method of claim 18, wherein
the substrate comprises a material comprising silicon.

* * * * *